(12) United States Patent
Ishiguro et al.

(10) Patent No.: US 10,157,348 B2
(45) Date of Patent: Dec. 18, 2018

(54) RELATED DATA GENERATING APPARATUS, RELATED DATA GENERATING METHOD, AND PROGRAM

(71) Applicant: Clarion Co., Ltd., Saitama-shi, Saitama (JP)

(72) Inventors: Masao Ishiguro, Tokyo (JP); Kazushige Hiroi, Tokyo (JP); Akio Hayashi, Saitama (JP); Haruhiko Sawajiri, Saitama (JP); Yasuki Horibe, Saitama (JP)

(73) Assignee: CLARION CO., LTD., Saitama (JP)

( * ) Notice: Subject to any disclaimer, the term of this patent is extended or adjusted under 35 U.S.C. 154(b) by 344 days.

(21) Appl. No.: 14/637,773

(22) Filed: Mar. 4, 2015

(65) Prior Publication Data

US 2015/0254574 A1    Sep. 10, 2015

(30) Foreign Application Priority Data

Mar. 7, 2014 (JP) ................. 2014-045088

(51) Int. Cl.
*G06F 17/30* (2006.01)
*G06N 99/00* (2010.01)

(52) U.S. Cl.
CPC ..... *G06N 99/005* (2013.01); *G06F 17/30663* (2013.01); *G06F 17/30861* (2013.01)

(58) Field of Classification Search
CPC ............ G06N 99/005; G06F 17/30663; G06F 17/30861
See application file for complete search history.

(56) References Cited

U.S. PATENT DOCUMENTS

2008/0040325 A1* 2/2008 Sachs ................ G06F 17/30648
2014/0322687 A1 10/2014 Wong et al.
2016/0006753 A1* 1/2016 McDaid .............. H04L 63/1425
726/23

FOREIGN PATENT DOCUMENTS

| CN | 102214186 A | 10/2011 |
| CN | 102831185 A | 12/2012 |
| JP | 2010-009307 A | 1/2010 |
| JP | 2013257747 A * | 12/2013 |

OTHER PUBLICATIONS

McDaid et al, System and Method for Embedded Mobile (EM)/ Machine to Machine (M2M) Security, Pattern Detection, Mitigation Aug. 28, 2014, EPO, WO/2014/128253.*

(Continued)

*Primary Examiner* — Jason G Liao
(74) *Attorney, Agent, or Firm* — Volpe and Koenig, P.C.

(57) ABSTRACT

Provided are a co-occurrence word data generating unit configured to generate co-occurrence word data including a co-occurrence word that is a vocabulary used along with a predetermined keyword in posted data in all periods and an appearance frequency of the co-occurrence word, from among pieces of posted data posed in a plurality of different periods; and a related data generating unit configured to generate related data including the co-occurrence word as a usual related word when a temporal variation in the appearance frequency of the co-occurrence word is smaller than a first threshold value and the appearance frequency is higher than a second threshold value.

11 Claims, 20 Drawing Sheets

(56) References Cited

OTHER PUBLICATIONS

Manning et al., Foundations of Statistical Natural Language Processing 1999, MIT Press, 704 pages.*
Zubiaga et al., Real-Time Classification of Twitter Trends Mar. 6, 2014, arXiv, arXiv:1403.1451, 15 pages.*
Asur et al., Trends in Social Media: Persistence and Decay 2011, Proceedings of Fifth ICWSM, https://www.aaai.org/ocs/index.php/ICWSM/ICWSM11/paper/viewFile/2815/3205.*
Doctor, What It Means When a Hashtag is Trending Nov. 16, 2012, hashtags.org, https://www.hashtags.org/featured/what-it-means-when-a-hashtag-is-trending/.*
Office Action in CN counterpart Application No. 201510098066.3 dated Nov. 2, 2017.

* cited by examiner

FIG. 4

POSTED DATA 200

| DATE | POSTER ID | POSTED BODY TEXT |
|---|---|---|
| 2013/04/01 12:00:00 | aaaaa | AAA is nice. |
| 2013/04/01 12:00:03 | bbbbb | Here is nice. |
| 2013/04/01 12:00:04 | ccccc | BBB is nice. |
| 2013/04/01 12:00:07 | ddddd | Here is nice. |
| 2013/04/01 12:00:15 | eeeee | DDD is nice. |
| 2013/04/01 12:00:18 | fffff | DDD is nice. |

201 — DATE
202 — POSTER ID
203 — POSTED BODY TEXT

FIG. 5

POI DATA 300

| 301 | 302 | 303 | 304 | 305 | 306 |
|---|---|---|---|---|---|
| POI ID | POI Name | CATEGORY | LONGITUDE | LATITUDE | ADDRESS |
| 10001 | AAAAA | CAFÉ | 140.3 | 35.3 | ************ |
| 10002 | BBBBB | CAFÉ | 140.5 | 35.5 | ************ |
| 10003 | CCCCC | CAFÉ | 140.5 | 35.3 | ************ |
| 10004 | DDDDD | RESTAURANT | 140.8 | 35.9 | ************ |
| 10005 | EEEEE | RESTAURANT | 141.1 | 36.2 | ************ |

PER-PERIOD CO-OCCURRENCE WORD DATA 400

KEYWORD "XXX"  PERIOD A1

| CO-OCCURRENCE WORD | FREQUENCY |
|---|---|
| HIGH PRICE HAMBURGER | 500 |
| HAMBURGER | 200 |
| HAMBURGER SET | 150 |
| CHILDREN'S SET | 100 |

KEYWORD "XXX"  PERIOD A2

| CO-OCCURRENCE WORD | FREQUENCY |
|---|---|
| XXX RANGER | 300 |
| HIGH PRICE HAMBURGER | 300 |
| HAMBURGER SET | 140 |
| HAMBURGER | 130 |

CO-OCCURRENCE WORD DATA 410

KEYWORD "XXX"  PERIOD A1 AND A2

| CO-OCCURRENCE WORD | FREQUENCY |
|---|---|
| HIGH PRICE HAMBURGER | 800 |
| HAMBURGER | 330 |
| HAMBURGER SET | 290 |
| ⋮ | |

FIG. 7

RELATED DATA 500

| KEY-WORD | USUAL RELATED WORD STRING 1 | USUAL RELATED WORD SCORE 1 | USUAL RELATED WORD STRING 2 | USUAL RELATED WORD SCORE 2 | | RELATED WORD SIMILAR NAME STRING 1 | RELATED WORD SIMILAR NAME SCORE 1 | RELATED WORD SIMILAR NAME STRING 2 | RELATED WORD SIMILAR NAME SCORE 2 | |
|---|---|---|---|---|---|---|---|---|---|---|
| 10001 | *** | 0 | *** | 0 | ·· | *** | 0 | *** | 0 | ·· |
| 10002 | *** | 0 | *** | 0 | ·· | *** | 0 | *** | 0 | ·· |
| 10003 | *** | 0 | *** | 0 | ·· | *** | 0 | *** | 0 | ·· |
| 10004 | *** | 0 | *** | 0 | ·· | *** | 0 | *** | 0 | ·· |
| 10005 | *** | 0 | *** | 0 | ·· | *** | 0 | *** | 0 | ·· |

501, 502, 503, 502, 503, 504, 505, 504, 505

FIG. 13
PER-KEYWORD CO-OCCURRENCE WORD DATA 700
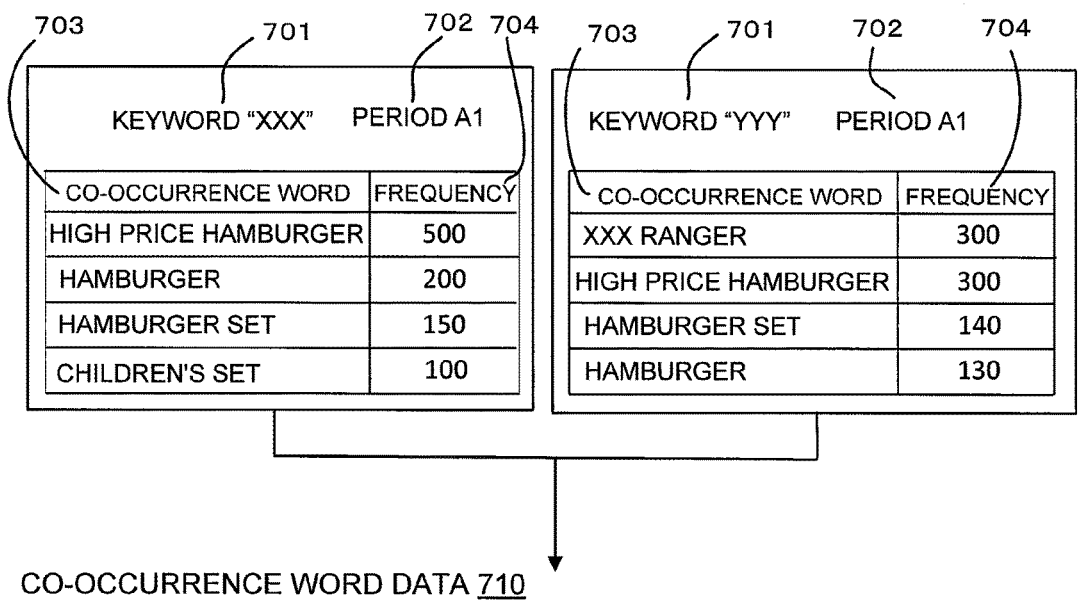
CO-OCCURRENCE WORD DATA 710
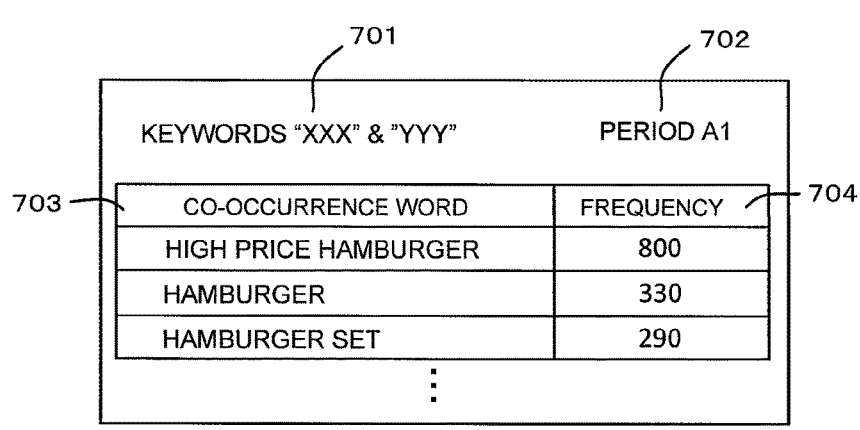

FIG. 16

TREND LEVEL DATA 900

| TARGET OF TREND LEVEL | TREND LEVEL |
|---|---|
| 10001 | 100 |
| 10002 | 50 |
| 10003 | 10 |
| 10004 | 10 |
| 10005 | 5 |

901 — TARGET OF TREND LEVEL
902 — TREND LEVEL

RELATED DATA GENERATING APPARATUS, RELATED DATA GENERATING METHOD, AND PROGRAM

BACKGROUND

Technical Field

The present invention relates to a related data generating apparatus, a related data generating method, and a program. The present invention claims priority to Japanese Patent Application No. 2014-045088 filed on Mar. 7, 2014, the contents of which are incorporated herein by reference in its entirety for the designated states where incorporation by reference of literature is allowed.

Related Art

A feature word automatic learning system for automatically learning a feature word corresponding to each merchandise category is disclosed in JP 2010-9307 A. The feature word automatic learning system includes a unit for acquiring the maximum 1,000 items of web texts by a retrieval engine by using a category name as a query; a unit for extracting feature word candidates from the maximum 1,000 items of web texts acquired by using the category name as a query; a unit for calculating relevancy between the extracted feature word candidates and the categories; and a feature word database for storing, for each category, feature word candidates whose relevancy is higher than a prescribed threshold value in association with a feature word corresponding to the category.

SUMMARY

The system in JP 2010-9307 A stores a feature word specified based on a web text posted at the present time in a feature word database. Therefore, it is impossible to create a feature word database in consideration of feature word candidates included in a web text posted at the past time.

Accordingly, an object of the present invention is to provide a related data generating apparatus capable of generating related data including a related word which has a high relevance to a predetermined keyword and a higher freshness.

To achieve the above object, a related data generating apparatus according to the present invention includes: a co-occurrence word data generating unit configured to generate co-occurrence word data including a co-occurrence word that is a vocabulary used along with a predetermined keyword in posted data in all periods and an appearance frequency of the co-occurrence word, from among pieces of posted data posted in a plurality of different periods; and a related data generating unit configured to generate related data including the co-occurrence word as a usual related word when a temporal variation in the appearance frequency of the co-occurrence word is smaller than a first threshold value and the appearance frequency is higher than a second threshold value.

According to the related data generating apparatus, it is possible to generate related data including a related word which has high relevance to a predetermined keyword and a higher freshness.

Also, other problems, configurations, and advantages will be clarified by the following description of embodiments.

BRIEF DESCRIPTION OF DRAWINGS

FIG. 4 is a diagram illustrating an example of posted data according to an embodiment of the present invention;

FIG. 5 is a diagram illustrating an example of POI data according to an embodiment of the present invention;

FIG. 6 is a diagram illustrating examples of co-occurrence word data and per-period co-occurrence word data according to an embodiment of the present invention;

FIG. 7 is a diagram illustrating an example of related data according to an embodiment of the present invention;

FIG. 13 is a diagram illustrating a co-occurrence word data 710 generated by using per-keyword co-occurrence word data 700 according to another embodiment (second embodiment) of the present invention;

FIG. 16 is a diagram illustrating an example of trend level data according to another embodiment (third embodiment) of the present invention;

DETAILED DESCRIPTION

Hereinafter, a related data generating apparatus according to an embodiment of the present invention will be described.

<First Embodiment>

Figure 1:
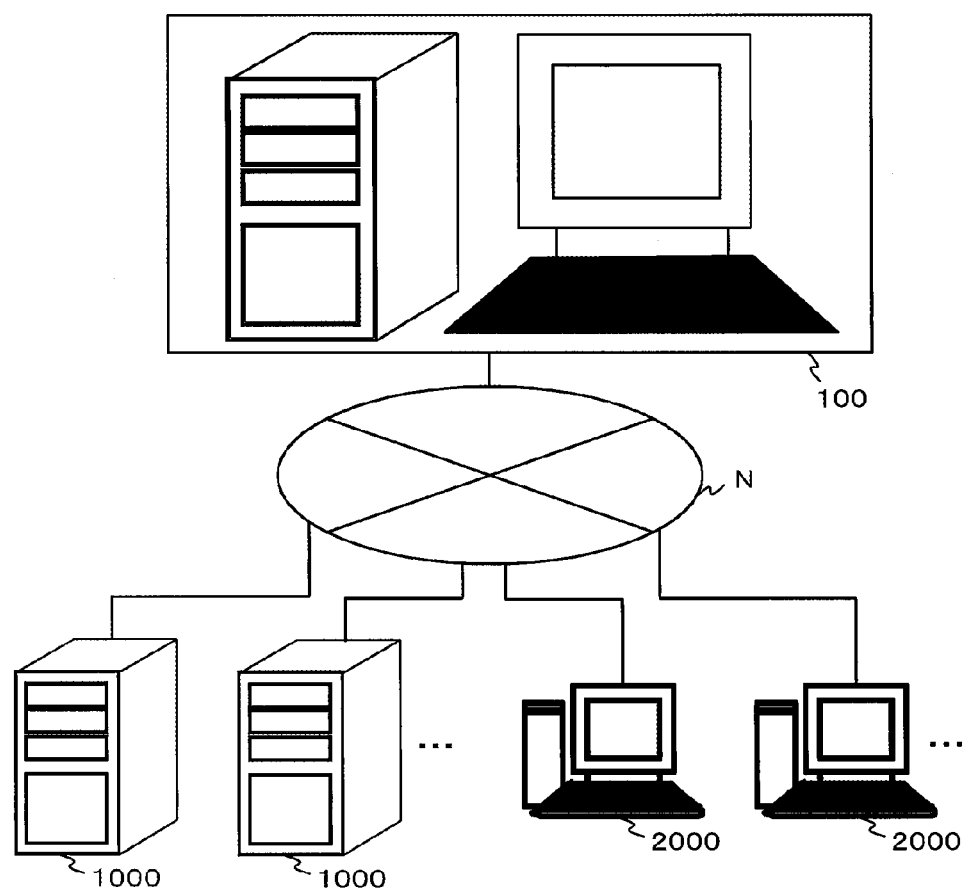
FIG. 1 is a diagram illustrating an example of a schematic configuration of a related data generating system including a related data generating apparatus according to an embodiment of the present invention.

FIG. 1 is a diagram illustrating an example of a schematic configuration of a related data generating system including a related data generating apparatus 100 according to the present embodiment. The related data generating system includes a related data generating apparatus 100, a social networking service (SNS) server 1000, and a user terminal 2000.

The related data generating apparatus 100 is an apparatus that generates related data in which a co-occurrence word used in posted data along with a predetermined keyword is stored as a related word by using the posted data acquired from the SNS server 1000. Also, in the present embodiment, generation of related data using a name of a point of interest (POI) as a keyword is described as an example of processing by the related data generating apparatus 100.

The SNS server 1000 is an apparatus having various functions for providing, for example, a social networking service (SNS) to a user (poster). The SNS server 1000 stores the posted data acquired from the user terminal 2000 in a storage device of the server 1000. Also, in the related data generating system, the SNS server 1000, the related data generating apparatus 100 and the user terminal 2000 are connected with each other through a predetermined network N, such as the Internet or dedicated lines.

Figure 2:
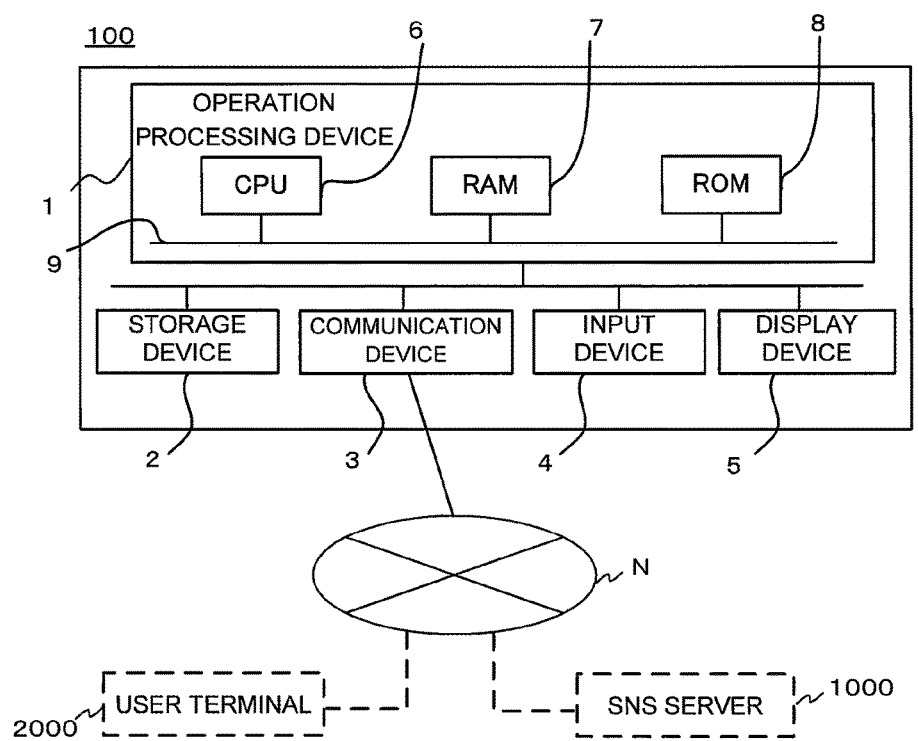
FIG. 2 is a diagram illustrating an example of a hardware configuration of a related data generating apparatus according to an embodiment of the present invention.

FIG. 2 is a diagram illustrating an example of a hardware configuration of a related data generating apparatus 100. The related data generating apparatus 100 includes an operation processing device 1, a storage device 2, a communication device 3, an input device 4, and a display device 5. Also, the related data generating apparatus 100 is communicably connected to an external apparatus, such as the SNS server 1000, through the communication device 3.

The operation processing device 1 is a central unit for performing various processes of the related data generating apparatus 100. Specifically, the operation processing device 1 acquires posted data which is posted within a predetermined period from the SNS server 1000 through the communication device 3. Also, the operation processing device 1 specifies a co-occurrence word used in the posted data along with a predetermined keyword using the posted data.

Also, the operation processing device 1 performs a process for determining whether to store the specified co-occurrence word into the related data as a related word and a synonym of the related word. Also, the operation processing device 1 generates and updates the related data corresponding to a result of the determination process.

The operation processing device 1 includes a central processing unit (CPU) 6 that executes various processes, such as numerical calculation or control of respective devices and sensors, a random access memory (RAM) 7 that temporarily stores programs, data, operation results, or the like, and a read only memory (ROM) 8 that stores programs, data, or the like. Also, the CPU 6, the RAM 7, and the ROM 8 are connected to one another through a bus 9.

The storage device 2 stores various pieces of information used for a process which the related data generating apparatus 100 performs. Specifically, the storage device 2 stores posted data 200, POI data 300, co-occurrence word data 410 and co-occurrence word data 710, per-period co-occurrence word data 400, per-keyword co-occurrence word data 700, related data 500, and trend level data 900.

The communication device 3 is a device that performs communication with the external apparatus (for example, the SNS server 1000).

The input device 4 is a device for receiving an instruction input from an administrator or the like of the related data generating apparatus 100, and includes a keyboard, a mouse, a touch panel, and the like.

The display device 5 is a device for displaying output information of the related data generating apparatus 100 and includes a liquid crystal display or the like.

The hardware configuration of the related data generating apparatus 100 has been described.

Figure 3:
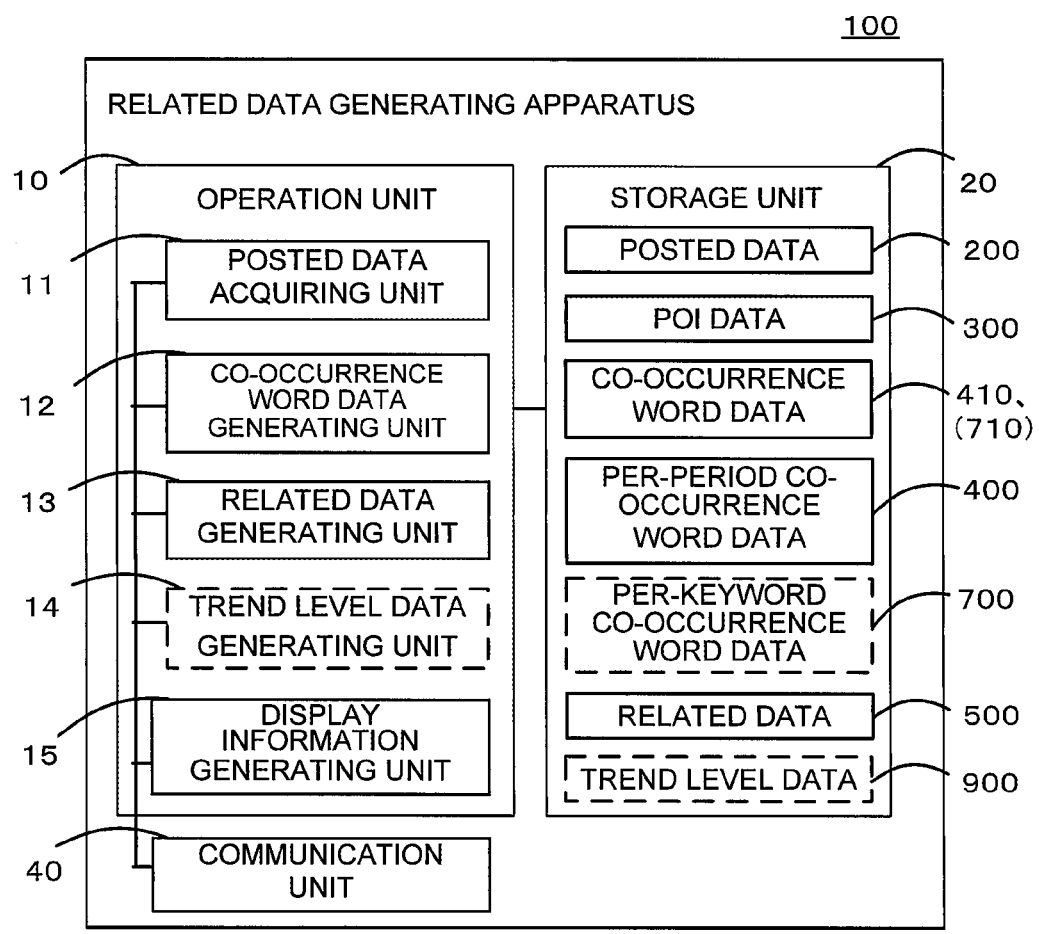
FIG. 3 is a functional block diagram illustrating an example of a functional configuration of a related data generating apparatus according to an embodiment of the present invention.

Next, functional blocks of the related data generating apparatus 100 will be described. FIG. 3 is a functional block diagram illustrating an example of a functional configuration of the related data generating apparatus 100. The functional blocks of the related data generating apparatus 100 are constructed by executing predetermined programs read by the CPU 6 mounted in the operation processing device 1. Therefore, programs for performing processes of respective functional units are stored in the ROM 8 and the storage device 2.

Also, the functional blocks of the related data generating apparatus 100 have been classified according to primary processing contents in order to make it easy to understand functions of the related data generating apparatus 100 implemented in the present embodiment. Also, the present invention is not limited by classification methods or names of respective functions. En addition, each configuration of the related data generating apparatus 100 may be classified into sub-elements according to processing contents. Also, classification may be performed such that a single element executes more processes.

Also, functional units of the related data generating apparatus 100 may be constructed by hardware (ASIC or the like). Also, processes of the respective functional units may be executed by one piece of hardware or may be executed by a plurality of pieces of hardware.

The related data generating apparatus 100 includes an operation unit 10, a storage unit 20, and a communication unit 40. Also, the operation unit 10 includes a posted data acquiring unit 11, a co-occurrence word data generating unit 12, a related data generating unit 13, and a display information generating unit 15. Also, a trend level data generating unit 14 will be described in a third embodiment, which will be described below. Also, the operation unit 10 is realized by the operation processing device 1.

The posted data acquiring unit 11 is a functional unit that acquires posted data 200 of a user from, for example, the SNS server 1000 or the like. Specifically, the posted data acquiring unit 11 periodically (for example, once a week) acquires posted data 200 from the SNS server 1000 or the like, through an application programming interface (API) or a method called crawling. Also, the posted data acquiring unit 11 stores the acquired posted data 200 in the storage unit 20.

The co-occurrence word data generating unit 12 is a functional unit that generates co-occurrence word data. Specifically, the co-occurrence word data generating unit 12 specifies a predetermined keyword and a co-occurrence word used along with the keyword in the posted data 200. Also, the co-occurrence word data generating unit 12 generates co-occurrence word data in which the specified co-occurrence word is included.

The related data generating unit 13 is a functional unit that generates and updates the related data 500. Specifically, the related data generating unit 13 performs a process for determining whether to include the co-occurrence word included in the co-occurrence word data into a usual related word string field or a related word similar name string field of the related data 500. Also, the related data generating unit 13 calculates scores of a usual related word and a related word similar name. Also, the related data generating unit 13 generates the related data 500 in which a usual related word string, a related word similar name string, and scores thereof are included to be mapped to a keyword.

The display information generating unit 15 is a functional unit that generates display information to be displayed on a display of the display device 5 or the user terminal 2000. Specifically, the display information generating unit 15 generates display information including a confirmation message for confirming whether to include the co-occurrence word in the related data 500 as a usual related word string or a related word similar name string.

Also, the storage unit 20 stores the posted data 200 acquired by the posted data acquiring unit 11, the POI data 300 that is master data previously stored in the storage unit 20, the co-occurrence word data 410 and the per-period co-occurrence word data 400 generated by the co-occurrence word data generating unit 12, and the related data 500 generated by the related data generating unit 13. Also, the per-keyword co-occurrence word data 700 will be described in a second embodiment as described below. Also, trend level data 900 generated by the trend level data generating unit 14 will be described in a third embodiment as described below.

FIG. 4 is a diagram illustrating an example of the posted data 200. The posted data 200 stored in the SNS server 1000 is acquired by the related data generating apparatus 100 periodically (for example, once a week) and is stored in the storage device 2 of the related data generating apparatus 100. The posted data 200 is data including posted contents of a user. Specifically, the posted data 200 has a record in which a date field 201, a poster ID field 202, and a posted body text field 203 are mapped to one another.

Information stored in the date field 201 is information specifying a date and time on which the SNS server 1000 receives the posted data 200. Information stored in the poster ID field 202 is an ID assigned to each user in various SNSs and is information uniquely specifying a user. Information stored in the posted body text field 203 is string information representing posted contents. In addition, the posted data 200 is used for a related data generating process. The related data generating process will be described in detail below.

FIG. 5 is a diagram illustrating an example of the POI data 300. The POI data 300 is master information previously stored in the storage device 2. The POI data 300 is information including a facility name, an address, or the like of a predetermined facility which is an object of interest or attention. Since an object of interest or attention is different from users, the POI data 300 includes various categories (for example, restaurant, entertainment facility, or park) of facility information. Specifically, the POI data 300 includes a POI ID field 301, a POI name field 302, a category field 303, a longitude field 304, a latitude field 305, and an address field 306.

Information stored in the POI ID field 301 is information that uniquely specifies a POI. Information stored in the POI name field 302 is information that specifies a POI name. Information stored in the category field 303 is information that specifies a category to which a POI belongs (for example, restaurant or entertainment facility). Information stored in the longitude field 304 and the latitude field 305 is information that specifies a longitude and a latitude which indicate a location of a POI. Although the longitude and the latitude are used as information specifying the location of the POI in the present invention, numerals capable of geographically specifying a place may be used, instead of the longitude and the latitude. Information stored in the address field 306 is information that specifies an address of a POI.

FIG. 6 is a diagram illustrating examples of the co-occurrence word data 410 and the per-period co-occurrence word data 400. The co-occurrence word data 410 and the per-period co-occurrence word data 400 are generated by the co-occurrence word data generating unit 12 during the related data generating process. The co-occurrence word data 410 and the per-period co-occurrence word data 400 are information including a co-occurrence word used in the posted data 200 along with a predetermined keyword. Specifically, each of the co-occurrence word data 410 and the per-period co-occurrence word data 400 has a keyword indication field 401, a period indication field 402, a co-occurrence word field 403, and a frequency field 404.

Information stored in the keyword indication field 401 is information specifying a keyword based on which a co-occurrence word is retrieved from the posted data 200 and in the present embodiment, corresponds to a predetermined POI name. Information stored in the period indication field 402 is information specifying a posting period of the posted data 200 that is a retrieval target for a co-occurrence word. Information stored in the co-occurrence word field 403 is information indicating a co-occurrence word retrieved from the posted data 200 based on a predetermined keyword. Information stored in the frequency field 404 is information indicating an appearance frequency of a co-occurrence word mapped thereto. Specifically, the frequency field 404 stores the number of pieces of posted data 200 including a co-occurrence word posted within a predetermined period.

FIG. 7 is a diagram illustrating an example of the related data 500. The related data 500 is generated or updated by the related data generation process. The related data 500 is data in which a related word having a high relevance to a predetermined keyword, a synonym having a high similarity to the predetermined keyword, and scores thereof are included. Specifically, the related data 500 has a record in which a keyword field 501, at least two pairs of usual related word string fields 502 and usual related word score fields 503, and at least one pair of related word similar name string field 504 and related word similar name score field 505 are mapped to one another.

Information stored in the keyword field 501 is information that specifies a keyword and in the present embodiment, common information with the POT ID stored in the POI ID field 301 of the POI data 300 (FIG. 5) is stored. Information stored in the usual related word string field 502 is string information that specifies a usual related word. Information stored in the usual related word score field 503 is information indicating a score of a usual related word mapped to the score field. For example, zero or a score calculated in the related data generating process is stored in the usual related word score field 503. When zero is stored in the usual related word score field 503, it means that a usual related word is not stored in the usual related word string field 502. Information stored in the related word similar name string field 504 is string information that specifies a related word similar name. Information stored in the related word similar name score field 505 is information indicating a score of a related word similar name to which the score field is mapped. Zero or a score calculated in the related data generating process is stored in the related word similar name score field 505. When zero is stored in the related word similar name score field 505, it means that a related word similar name is not stored in the related word similar name string field 504.

Also, the storage unit 20 is realized by the storage device 2, the RAM 7, and the ROM 8.

The communication unit 40 is a functional unit that performs communication with an external apparatus (for example, the SNS server 1000). The communication unit 40 is realized by the communication device 3.

As described above, the functional blocks of the related data generating apparatus 100 has been described.

[Description of Operation]

Figure 8:
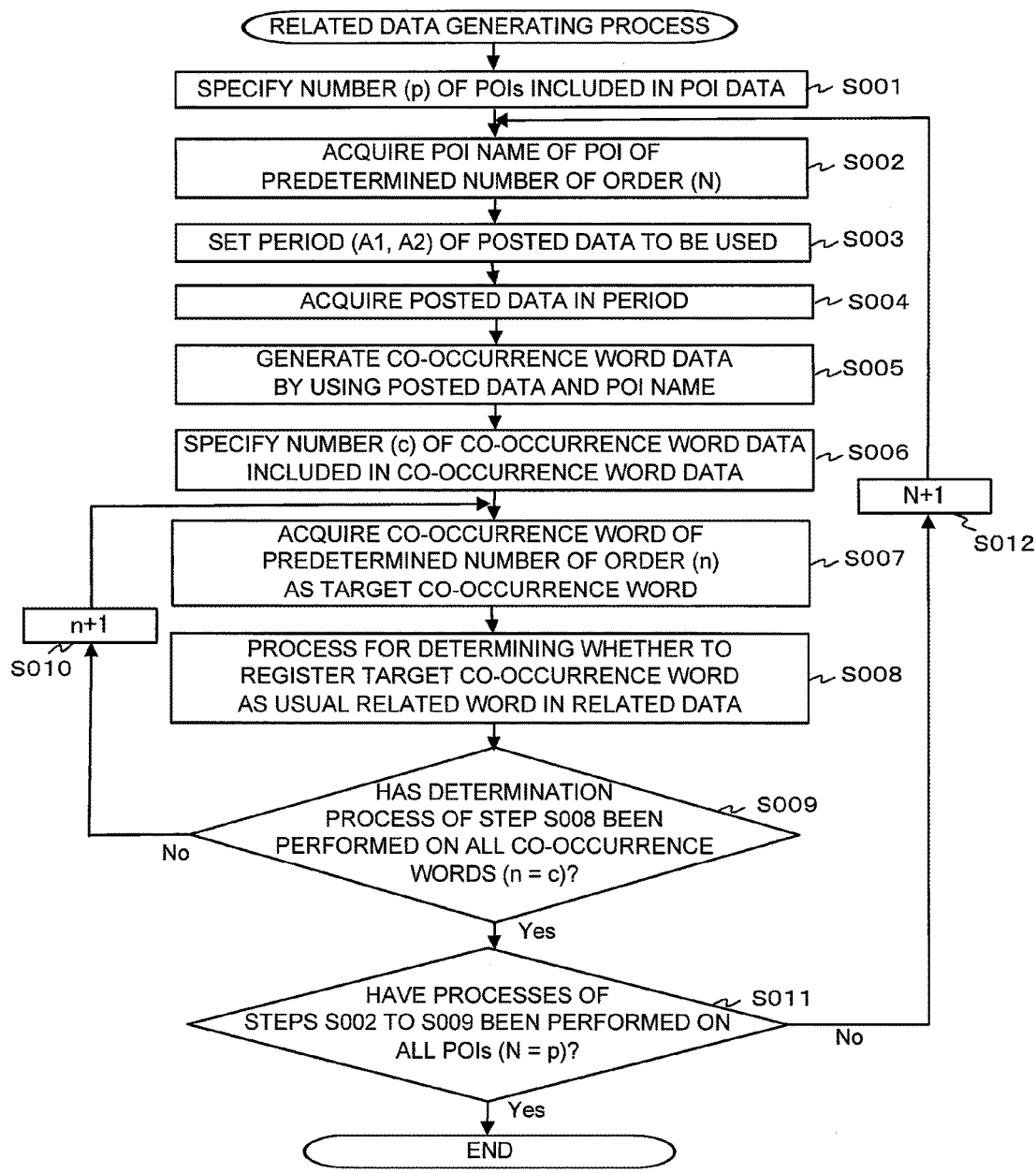
FIG. 8 is a flowchart illustrating a flow of a related data generating process according to an embodiment of the present invention.

Next, the related data generating process will be described. FIG. 8 is a flowchart illustrating a flow of the related data generating process. The related data generating process is performed periodically (for example, once a week) through batch processing executed in the related data generating apparatus 100.

When the related data generating process is started, the co-occurrence word data generating unit 12 specifies the number (p) of POIs included in the POI data 300 (step S001). For example, the co-occurrence word data generating unit 12 specifies the number (p) of POIs by the number of records included in the POI data 300.

Next, the co-occurrence word data generating unit 12 acquires a POI name of a predetermined number of order (N) (step S002). For example, the co-occurrence word data generating unit 12 acquires the POI name of a predetermined number of order when a POI name stored in the uppermost record of the POI data 300 is assumed as being a POI name of a first order.

Next, the co-occurrence word data generating unit 12 sets a period of the posted data 200 to be used (step S003). Specifically, the co-occurrence word data generating unit 12 sets at least two predetermined periods (for example, one month) at different times. For example, the co-occurrence word data generating unit 12 of the present embodiment sets two periods (A1 and A2) each having one month (from the 1st to the 31st in each month) at different times which are spaced by 3 months (for example, April and July). It is assumed that A2 is a closer (recent) period to the present time than A1. The set time and the set period may be previously stored in the storage device 2 or the ROM 8.

Next, the co-occurrence word data generating unit 12 acquires posted data 200 within the set period from the storage device 2 (step 3004).

Then, the co-occurrence word data generating unit 12 generates co-occurrence word data by using the posted data 200 and the POI name (step S005). Specifically, the co-occurrence word data generating unit 12 extracts the posted data 200 in which the POI name acquired in step S002 is included from the posted data 200 posted during each of the set periods. Also, the co-occurrence word data generating unit 12 extracts all vocabularies (for example, a phrase corresponding to a noun) included in the extracted posted data 200 and calculates the number of pieces of posted data 200, in which at least one extracted vocabulary is included, as a frequency with respect to each vocabulary. For example, the co-occurrence word data generating unit 12 may assign a higher weight to a frequency of a vocabulary extracted from the posted data 200 of the recent period (A2) than a frequency of a vocabulary extracted from the posted data 200 of the period (A1) prior to the recent period.

Also, the co-occurrence word data generating unit 12 generates per-period co-occurrence word data 400 in which a vocabulary extracted from the posted data 200 is mapped to a frequency thereof, with respect to each period (A1 and A2). Also, the co-occurrence word data generating unit 12 specifies a predetermined number of (for example, five) vocabularies, each of which is the same vocabulary included in all per-period co-occurrence word data 400. In descending order of a total frequency obtained by summing up frequencies of the co-occurrence word data 400 in respective periods. Also, the co-occurrence word data generating unit 12 generates co-occurrence word data 410 in which the specified vocabulary and a frequency of the vocabulary are mapped to each other and stored in the co-occurrence word field 403 and the frequency field 404.

Next, the related data generating unit 13 specifies the number (c) of co-occurrence words included in the co-occurrence word data (step S006). For example, the related data generating unit 13 specifies the number (c) of co-occurrence words included in the co-occurrence word data from the number of records of the co-occurrence word data 410.

Next, the related data generating unit 13 acquires a co-occurrence word of a predetermined number of order (n) as a target co-occurrence word (step S007). Specifically, the related data generating unit 13 acquires a co-occurrence word of a predetermined number of order when a co-occurrence word stored in the uppermost position of the co-occurrence word data 410 is set as a co-occurrence word of a first order.

Next, the related data generating unit 13 performs a determination process for determining to store the target co-occurrence word in the related data 500 as a usual related word (step S008). The determination process will be described in detail below.

Next, the related data generating unit 13 determines whether the determination process of step S008 is performed on all co-occurrence words (step S009). That is, the related data generating unit 13 determines whether a relationship of n=c is established. When it is determined that the determination process of step S008 has not been performed on all co-occurrence words (No in step S009), that is, when n≠c is satisfied, the related data generating unit 13 increments the order of a co-occurrence word to be acquired by adding one to n (step S010), and acquires a co-occurrence word of a subsequent order as a target co-occurrence word (step S007). Also, the related data generating unit 13 repeatedly executes the processes of steps S007 to S010 until it is determined that the determination process of step S008 has been performed on all co-occurrence words.

Also, when it is determined that the determination process of step S008 has been performed on all co-occurrence words (Yes in step S009), the related data generating unit 13 determines whether processes of steps S002 to S009 have been performed on all POIs (step S011). That is, the related data generating unit 13 determines whether a relationship of N=p is established. In addition, when the processes have not been performed on all POIs (No in step S011), the related data generating unit 13 increments the order of a POI name to be acquired by adding one to N (step S012), and acquires a POI name of a subsequent order from the POI data 300.

On the other hand, when it is determined that the processes have been performed on all POI names (Yes in step S011), the related data generating unit 13 ends the flow.

Figure 9:
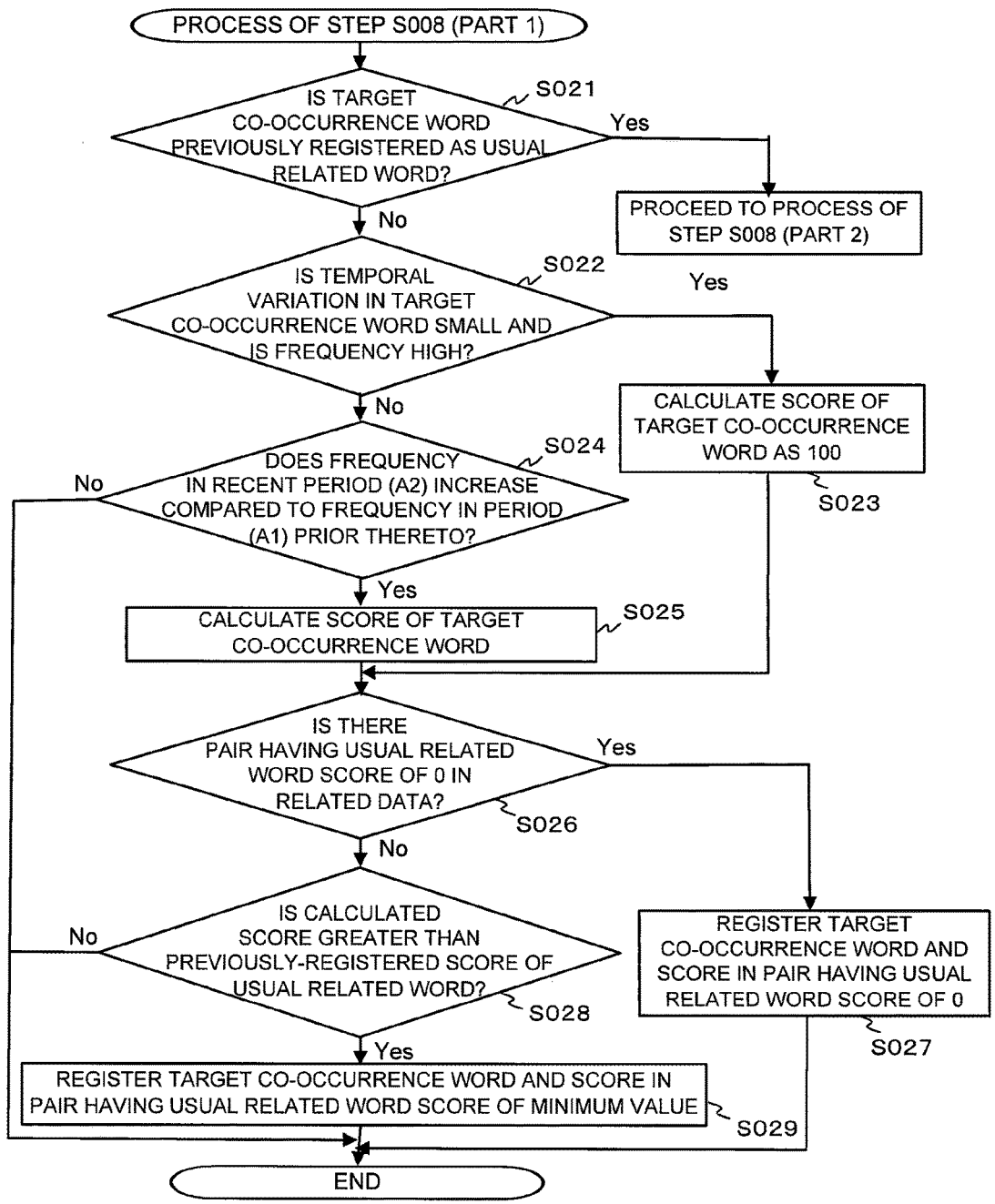
FIG. 9 is a flowchart illustrating a flow of a process of step S008 (part 1) according to an embodiment of the present invention.

Next, there will be described the determination process (hereinafter, referred to as a process of step S008 (part 1)) for determining whether to store a target co-occurrence word in the related data 500 as a usual related word. FIG. 9 is a flowchart illustrating a flow of a process of step S00 (part 1).

When a relevant process is started, the related data generating unit 13 determines whether a target co-occurrence word is previously stored in the related data 500 as a usual related word (step S021). Specifically, the related data generating unit 13 compares the target co-occurrence word acquired in step S007 with information stored in the usual related word string field of the related data 500 and determines whether the target co-occurrence word is previously stored in the usual related word string field. When it is determined that the target co-occurrence word is previously stored as the usual related word (Yes in step S021), the related data generating unit 13 proceeds to "a process of step S008 (part 2)". The "process of step S008 (part 2)" will be described below.

On the other hand, when it is determined that the target co-occurrence word is not stored as the usual related word (No in step S021), the related data generating unit 13 proceeds to a process of step S022.

Next, the related data generating unit 13 determines whether a temporal variation in the target co-occurrence word is small, and a frequency of the target co-occurrence word is high (step S022). Specifically, the related data generating unit 13 performs the determination process by using the following formula 1.

$$\frac{\sqrt{\sigma(x(p)^2}}{\overline{x(p)}} < \alpha \text{ AND } \overline{x(p)} > \beta \qquad \text{[Mathematical Formula 1]}$$

where x is a total frequency obtained by summing up frequencies in respective periods, that is, a frequency of co-occurrence word data. Also, $\delta(x(p))^2$ denotes distribution of frequencies of a POI name of a p-th order in respective periods A1 to AN. Also, a bar over x(p) in the right side of AND indicates an average of frequencies in the respective periods A1 to AN of the POI name of the p-th order. Also, $\alpha$ and $\beta$ denotes predetermined threshold values ($\alpha$ is a first threshold value and $\beta$ is a second threshold value).

When a condition of formula 1 is satisfied, the related data generating unit 13 determines that a temporal variation in the target co-occurrence word is small, and a frequency of the target co-occurrence word is high (Yes in step S022). In this case, the related data generating unit 13 calculates a score of the target co-occurrence word as 100 (step S023) and proceeds to a process of step S026.

On the other hand, when a condition of formula 1 is not satisfied, the related data generating unit 13 determines that any one of a condition that a temporal variation in the target co-occurrence word is small, and a condition that a frequency of the target co-occurrence word is high is not satisfied (No in step S022). In this case, the related data generating unit 13 proceeds to a process of step S024.

Next, the related data generating unit 13 determines whether the frequency of the target co-occurrence word in the recent period (A2) increases compared to the frequency in the period (A1) prior thereto (step S024). In a case in which the frequency in the recent period increases, since the frequency increases even temporarily, it is considered as appropriate to select the target co-occurrence word as a storage candidate of the usual related word. Specifically, the related data generating unit 13 performs the determination process by using the following formula 2.

$$x(p, n-1) \leq \gamma \text{ AND } x(p, n) \geq \delta \qquad \text{[Mathematical Formula 2]}$$

where x(p, n) denotes a frequency of a POI name of a p-th order in a recent period (AN). x(p, n−1) denotes a frequency of a POI name of a p-th order in a period (A1) prior to the recent period. Also, $\gamma$ and $\beta$ denote predetermined threshold values satisfying a relationship of $\gamma < \beta < \delta$ ($\gamma$ is a third threshold value and $\delta$ is a fourth threshold value).

When a condition of formula 2 is not satisfied, the related data generating unit 13 determines that the frequency in the recent period (A2) does not increase compared to the frequency in the period (A1) prior to the period (A2) (No in step S024). In this case, the related data generating unit 13 ends the flow.

On the other hand, when a condition of formula 2 is satisfied, the related data generating unit 13 determines that the frequency in the recent period (A2) increases compared to the frequency in the period (A1) prior to the period (A2) (Yes in step S024). In this case, the related data generating unit 13 proceeds to a process of step S025.

Next, the related data generating unit 13 calculates a score of the target co-occurrence word (step S025). Specifically, the related data generating unit 13 calculates a score of the target co-occurrence word by using the following formula 3. Also, when calculating the score of the target co-occurrence word, the related data generating unit 13 proceeds to a process of step S026.

$$\text{score} = \frac{x(p, n)}{\max(x(n))} \qquad \text{[Mathematical Formula 3]}$$

where, max(x(n)) denotes the maximum value of the frequency of the cc-occurrence word stored in the per-period co-occurrence word data 400 in the recent period AN. A value of the score is greater than 0 and equal to or less than 1.

Next, the related data generating unit 13 determines whether there is a pair in which a usual related word score is 0 in the related data 500 (step S026). When it is determined that there is a pair in which the score is 0 (Yes in step S026), the related data generating unit 13 stores a target co-occurrence word and a score in the pair having the usual related word score of 0 (step S027) and ends the flow. Specifically, the related data generating unit 13 specifies a usual related word score field 503 in which 0 is stored and a usual related word string field 502, which constitutes one pair along with the score field 503. Also, the related data generating unit 13 stores a target co-occurrence word in the specified usual related word string field 502 and stores the score calculated in step S023 or the score calculated in step S025 in the specified usual related word score field 503.

On the other hand, when it is determined that there is no pair in which a usual related word score is 0 in the related data 500 (No in step 3026), the related data generating unit 13 determines whether the score calculated in step S023 or step S025 is greater than a score of the usual related word which is previously stored (step S028). In addition, when it is determined that the calculated score is not greater than the previously-stored score of the usual related word (No in step S028), the related data generating unit 13 ends the flow.

On the other hand, when it is determined that the calculated score is greater than the previously-stored score of the usual related word (Yes in step S028), the related data generating unit 13 stores the target co-occurrence word and the score in a pair in which a usual, related word score is the minimum value (step S029). Specifically, the related data generating unit 13 performs comparison of the previously-stored usual related word score, and specifies the usual related word score field 503 in which the score of the minimum value is stored and the usual related word string field 502 which constitutes a pair along with the usual related word score field 503. Also, the related data generating unit 13 stores a target co-occurrence word in the specified usual related word string field 502 and stores the score calculated in step S023 or the score calculated in step S025 in the specified usual related word score field 503.

Figure 11:
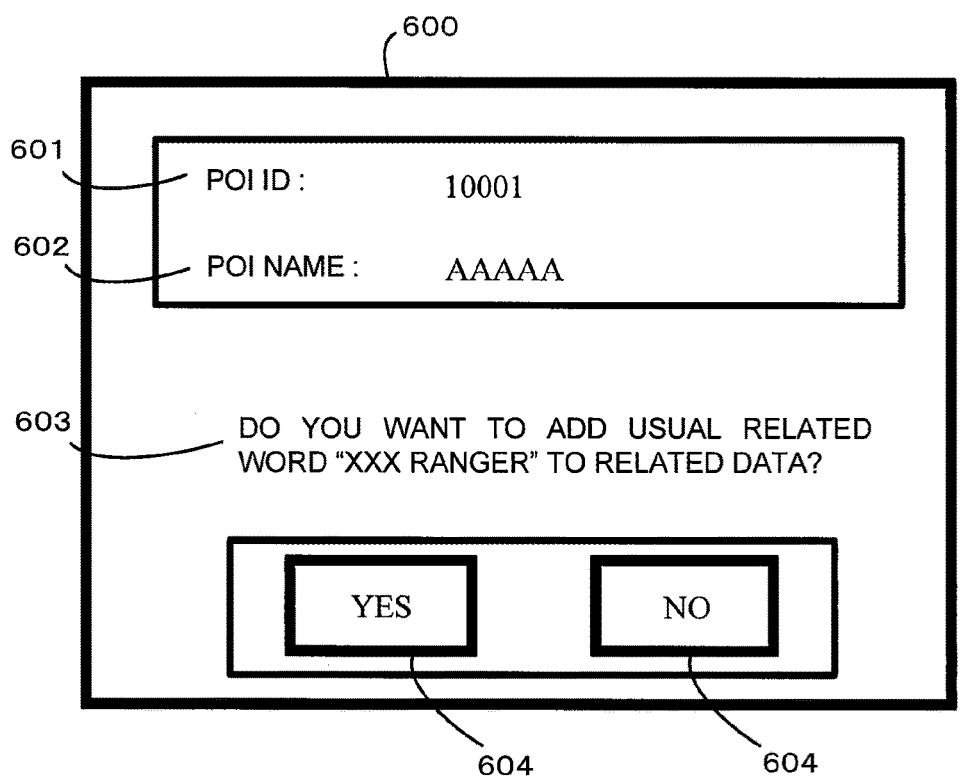
FIG. 11 is a diagram illustrating an example of a display screen of a related data generating apparatus according to an embodiment of the present invention.

In the processes of step S027 and step S029, the display information generating unit 15 may generate message screen information which confirms whether to register the usual related word in the related data 500. FIG. 11 is a diagram illustrating an example of a display screen 600 of a related data generating apparatus 100. The display information generating unit 15 generates and outputs, to the display device 5, indication information displaying, for example, a POI ID 601, a POI name 602, a message 603, such as "Do you want to add usual related word 'XXX RANGER' to related data?", and an indication receiving button 604 of "YES" or "NO". An administrator of the related data generating apparatus 100 checks the message, and then selects the indication receiving button 604 of "YES". Therefore, the related data generating unit 13 stores the usual related word in the usual related word string field 502 of the related data 500.

Figure 10:
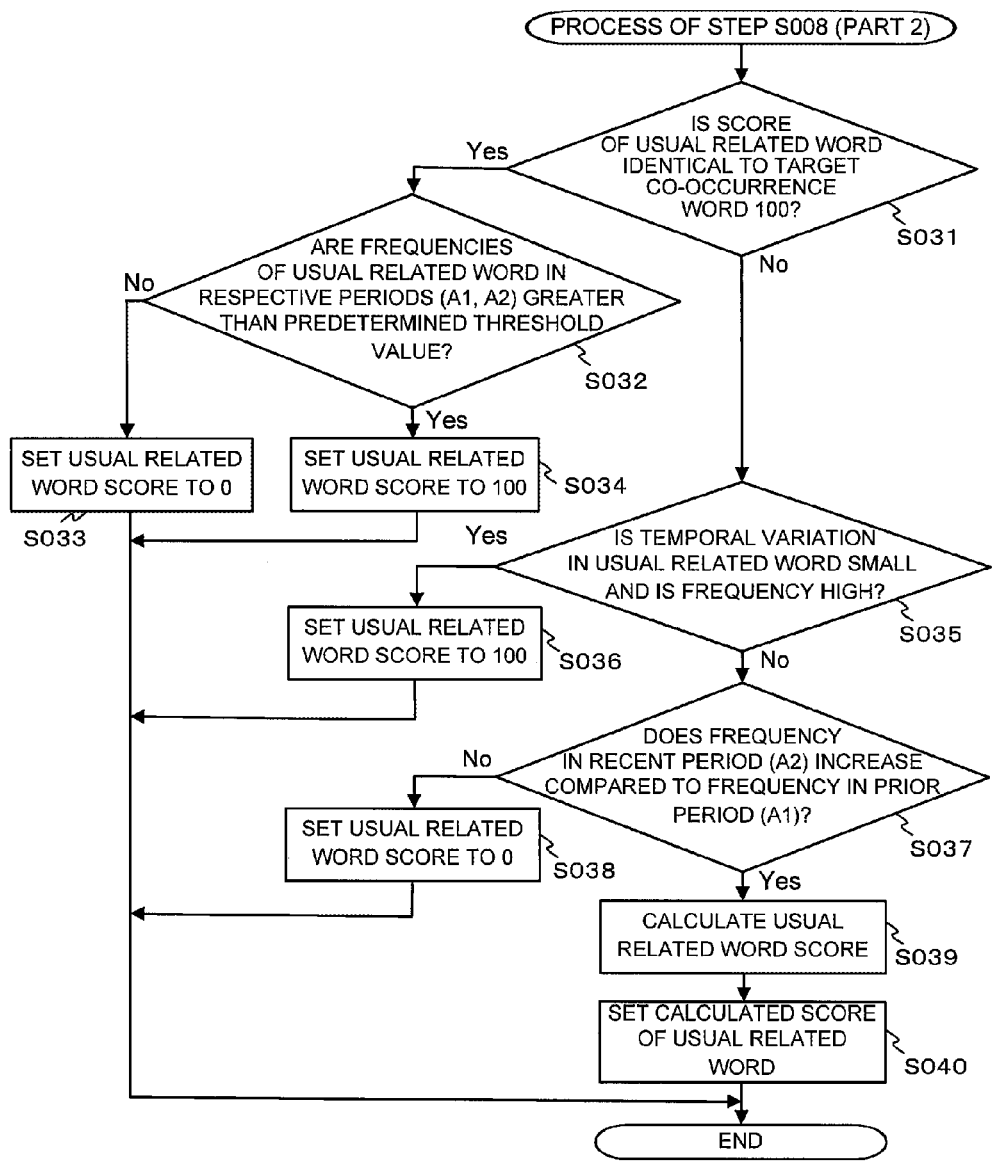
FIG. 10 is a flowchart illustrating a flow of a process of step S008 (part 2) according to an embodiment of the present invention.

Next, there will be described a case in which a target co-occurrence word is previously stored as a usual related word in the determination process for determining whether to store a target co-occurrence word in the related data 500 as a usual related word (hereinafter, referred to as a process of step S008 (part 2)). FIG. 10 is a flowchart illustrating a flow of the process of step S008 (part 2).

When a relevant process is started, the related data generating unit 13 determines whether a score of a usual related word which is identical to a target co-occurrence word is 100 (step S031). Specifically, the related data generating unit 13 determines whether a value of a score stored in the usual related word score field 503 which constitutes one pair along with the usual related word string field 502 which is identical to a target co-occurrence word is 100. When it is determined that the value of the score is 103 (Yes in step S031), the related data generating unit 13 proceeds to a process of step S032.

On the other hand, when it is determined that the value of the score is not 100 (No in step S031), the related data generating unit 13 proceeds to a process of step S035.

In step S032, the related data generating unit 13 determines whether a frequency of the usual related word in each period (A1 and A2) is higher than a predetermined threshold value $\gamma$. Specifically, the related data generating unit 13 calculates a frequency of the usual related word in each period by the number of pieces of posted data 200 including the usual related word, from among pieces of posted data 200 posted during each period (A1 and A2). Also, the related data generating unit 13 determines whether the frequency of the usual related word in each period (A1 and A2) is higher than the predetermined threshold value $\gamma$ by substituting the calculated frequency of the usual related word into the following formula 4.

$$x(p, n-1) \leq \gamma \text{ AND } x(p, n) \leq \gamma \qquad \text{[Mathematical Formula 4]}$$

In the formula 4, x(p, n−1) denotes a frequency of the usual related word in the period A1 prior to the recent period similarly as described above. Also, x(p, n) denotes a frequency of the usual related word in the recent period A2 similarly as described above. Also, $\gamma$ denotes a predetermined threshold value similarly as described above.

When it is determined that the calculated frequency of the usual related word in each period is higher than the predetermined threshold value $\gamma$ (Yes in step S032), the related data generating unit 13 sets a score of the usual related word to 100 (step S034). Specifically, the related data generating unit 13 stores 100 in the usual related word score field 503, which constitutes a pair along with the usual related word string field 502 and ends the flow. On the other hand, when it is determined that the calculated frequency of the usual related word in each period is not higher than the predetermined threshold value $\gamma$ (No in step 3032), the related data generating unit 13 stores 0 in the usual related word score field 503 which constitutes a pair along with the usual related word string field 502 (step S033) and ends the flow.

Also, in step S035, the related data generating unit 13 determines whether a temporal variation in the usual related word is small, and a frequency of the usual related word is high (step S035). Specifically, the related data generating unit 13 calculates a frequency of the usual related word in each period by the number of pieces of posted data 200 including the usual related word, from among pieces of posted data 200 posted during each period (A1 and A2). Also, the related data generating unit 13 performs the determination process of step S035 by substituting the calculated frequency of the usual related word in each period into the above formula 1. Also, since the determination is similar to the above-described step S21, a detailed description thereof will be omitted.

When it is determined that a temporal variation in the usual related word is small, and the frequency of the usual related word is high (Yes in step S035), the related data generating unit 13 sets 100 in the usual related word score field 503 which constitutes a pair along with the usual related word string field 502 and ends processing of the flow. On the other hand, when it is determined that the usual related word does not satisfy at least one of a condition that a temporal variation in the usual related word is small and a condition that the frequency of the usual related word is high (No in step S035), the related data generating unit 13 proceeds to a process of step S037.

Next, the related data generating unit 13 determines whether the frequency of the usual, related word in the recent period (A2) increases compared to the frequency in the period (A1) prior thereto (step S037). In a case in which the frequency in the recent period increases, since the frequency increases even temporarily, there is a case in which it is appropriate to maintain storage of the usual related word. Specifically, the related data generating unit 13 calculates a frequency of the usual related word in each period (A1 and A2) and performs a determination process by substituting the calculated frequency into the above-described formula 2, similarly to the above-described step S032.

When a condition of formula 2 is not satisfied, the related data generating unit 13 determines that the frequency in the recent period (A2) does not increase compared to the frequency in the period (A1) prior to the recent period (A2) (No in step S037). In this case, the related data generating unit 13 sets 0 in the usual related word score field 503 which constitutes a pair along with the usual related word string field 502 (step S038) and ends processing of the flow.

On the other hand, when a condition of formula 2 is satisfied, the related data generating unit 13 determines that the frequency in the recent period (A2) increases compared to the frequency in the period (A1) prior to the recent period (A2) (Yes in step S037). In this case, the related data generating unit 13 calculates a score of the usual related word (step S039). Specifically, the related data generating unit 13 sets a maximum value of a frequency of the co-occurrence word stored in the per-period co-occurrence word data 400 in the recent period (A2). Also, the related data generating unit 13 calculates the score of the usual related word by substituting the specified maximum value of the frequency of the co-occurrence word and the frequency of the usual related word calculated in step S035 into the above-described formula 3.

Subsequently, the related data generating unit 13 sets the calculated score of the usual related word (step 3040). Specifically, the related data generating unit 13 stores the calculated score of the usual related word in the usual related word score field 503 which constitutes a pair along with the usual related word string field 502, and ends the flow.

Until now, the related data generating process according to the first embodiment has been described.

According to the related data generating apparatus 100, it is possible to generate the related data 500 including a related word having a high relevance to a predetermined keyword and a higher freshness. In particular, the related data generating apparatus 100 determines whether to register a co-occurrence word used in posted data 200 along with a predetermined keyword as related data 500. Specifically, the related data generating apparatus 100 performs registration of the co-occurrence word in the related data 500 depending on a result of the determination of whether a temporal variation in an appearance frequency of the co-occurrence word is small and the frequency is high.

Also, even in a case in which the temporal variation in the appearance frequency of the co-occurrence word is large or a case in which the frequency is low, when the appearance frequency in the recent period increases, the related data generating apparatus 100 maps a predetermined score to the co-occurrence word and registers the co-occurrence word in the related data 500. Therefore, it is possible to rank usual related words registered in the related data 500 according to scores thereof and use a previously-registered usual related word as a comparison value upon updating. As a result, it is possible to maintain the related data 500 in a state of including a related word having a high freshness.

<Second Embodiment>

Hereinafter, a related data generating apparatus 100 according to a second embodiment of the present invention will be described. Although a co-occurrence word used along with a predetermined keyword (for example, a POI name) in the posted data 200 is stored as a usual related word in the related data 500 in the above-described first embodiment, the related data generating apparatus 100 according to the present embodiment stores a synonym similar to the predetermined keyword in the related data 500. Since a basic hardware configuration and functional blocks of the related data generating apparatus 100 are similar to those of the first embodiment as described above, a detailed description thereof will be omitted.

Figure 12:
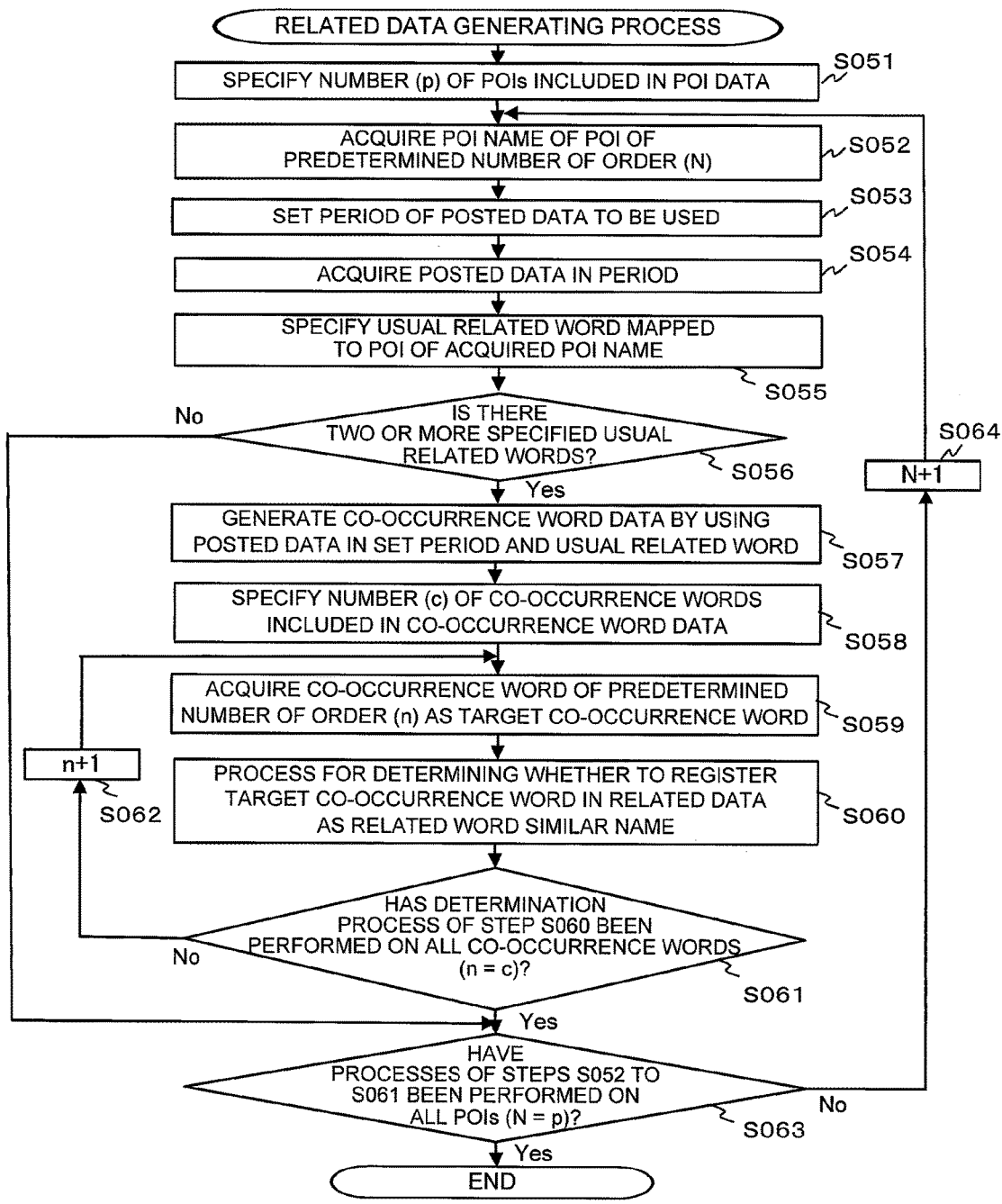
FIG. 12 is a flowchart illustrating a flow of a related data generating process according to another embodiment (second embodiment) of the present invention.

FIG. 12 is a flowchart illustrating a flow of a related data generating process according to a second embodiment. The related data generating process is performed periodically (for example, once a week) by batch processing executed in the related data generating apparatus 100.

When the related data generating process is started, the co-occurrence word data generating unit 12 specifies the number (p) of POIs included in the POI data 300 (step S051) and acquires a POI name of a predetermined number of order (N) (step S052). Since the process is similar to those of the steps S001 to S002, a description thereof will be omitted.

Next, the co-occurrence word data generating unit 12 sets a period of posted data 200 to be used (step S053). Specifically, the co-occurrence word data generating unit 12 sets a predetermined period (for example, one month) at a predetermined time. It is assumed that the set time and the set period are previously stored in the storage device 2 or the ROM 8.

Next, the co-occurrence word data generating unit 12 acquires posted data 200 within the set period from the storage device 2 (step S054).

Then, the co-occurrence word data generating unit 12 specifies a usual related word which is mapped to a POI of the acquired POI name (step S055). Specifically, the co-occurrence word data generating unit 12 specifies a usual related word stored in the usual related word string field 502, from a record of related data 500 in which a POI ID specifying a POI name specified in step S052 is stored.

Next, the co-occurrence word data generating unit 12 determines whether there are two or more specified usual related words (step S056). That is, the co-occurrence word data generating unit 12 determines whether there are at least two pairs in each of which a value greater than 0 is stored in the usual related word score field 505 of the related data 500. When it is determined that there are not two or more specified usual related words (No in step S056), the co-occurrence word data generating unit 12 proceeds to a process of step S063. On the other hand, when it is determined that there are two or more specified usual related words (Yes in step S056), the co-occurrence word data generating unit 12 proceeds to a process of step S057.

Then, the co-occurrence word data generating unit 12 generates co-occurrence word data by using the posted data 200 within the set period and the usual related word (step S057). Specifically, the co-occurrence word data generating unit 12 extracts the posted data 200 within the set period including the keyword by using the usual related word specified in step S055 as a keyword. Also, the co-occurrence word data generating unit 12 extracts all vocabularies (for example, a phrase corresponding to a noun) included in the extracted posted data 200 and calculates the number of pieces of posted data 200, in which at least one extracted vocabulary is included, as a frequency of the vocabulary, with respect to each keyword.

Also, the co-occurrence word data generating unit 12 stores an extracted vocabulary and a frequency thereof in a state of being mapped to the co-occurrence word field 703 and the frequency field 704 of the per-keyword co-occurrence word data 700. That is, the co-occurrence word data generating unit 12 generates at least two pieces of per-keyword co-occurrence word data 700. Also, the co-occurrence word data generating unit 12 specifies a predetermined number of (for example, five) vocabularies, each of which is the same vocabulary included in all per-keyword co-occurrence word data 700, in descending order of a total frequency obtained by summing up frequencies of each piece of the per-keyword co-occurrence word data 700. Also, the co-occurrence word data generating unit 12 stores the specified vocabulary in the co-occurrence word field 703 and generates the co-occurrence word data 710 in which the calculated frequency is stored in the frequency field 704.

FIG. 13 is a diagram illustrating co-occurrence word data 710 generated by using the per-keyword co-occurrence word data 700.

Next, the related data generating unit 13 specifies the number (c) of co-occurrence words included in the co-occurrence word data (step 3058) and acquires a co-occurrence word of a predetermined number of order (n) as a target co-occurrence word (step S059). Note that, since processes of steps S058 to S059 are identical to the processes of the above-described steps S006 to S007, a description thereof will be omitted.

Next, the related data generating unit 13 performs a determination process for determining to store the target co-occurrence word in the related data 500 as a related word similar name (step S060). The determination process will be described in detail below.

Next, the related data generating unit 13 determines whether the determination process of step S060 is performed on all co-occurrence words (step S061). That is, the related data generating unit 13 determines whether a relationship of n=c is established. When it is determined that the determination process of step S060 has not been performed on all co-occurrence words (No in step S061), that is, when n≠c is satisfied, the related data generating unit 13 increments the order of a co-occurrence word to be acquired by adding one to n (step S062), and acquires a co-occurrence word of a subsequent order as a target co-occurrence word (step S059). Also, the related data generating unit 13 repeatedly executes the processes of steps S059 to S062 until it is determined that the determination process of step S060 has been performed on all co-occurrence words.

Also, when it is determined that the determination process of step 3060 has been performed on all co-occurrence words (Yes in step S061), the related data generating unit 13 determines whether processes of steps S052 to S061 have been performed on all POI names (step S063). That is, the related data generating unit 13 determines whether a relationship of N=p is established. In addition, when it is determined that the processes have not been performed on all POI names (No in step S063), the related data generating unit 13 increments the order of a POT name to be acquired by adding one to N (step S064), and acquires a POI name of a subsequent order from the POI data 300.

On the other hand, when it is determined that the processes have been performed on all POI names (Yes in step S063), the related data generating unit 13 ends the flow.

Figure 14:
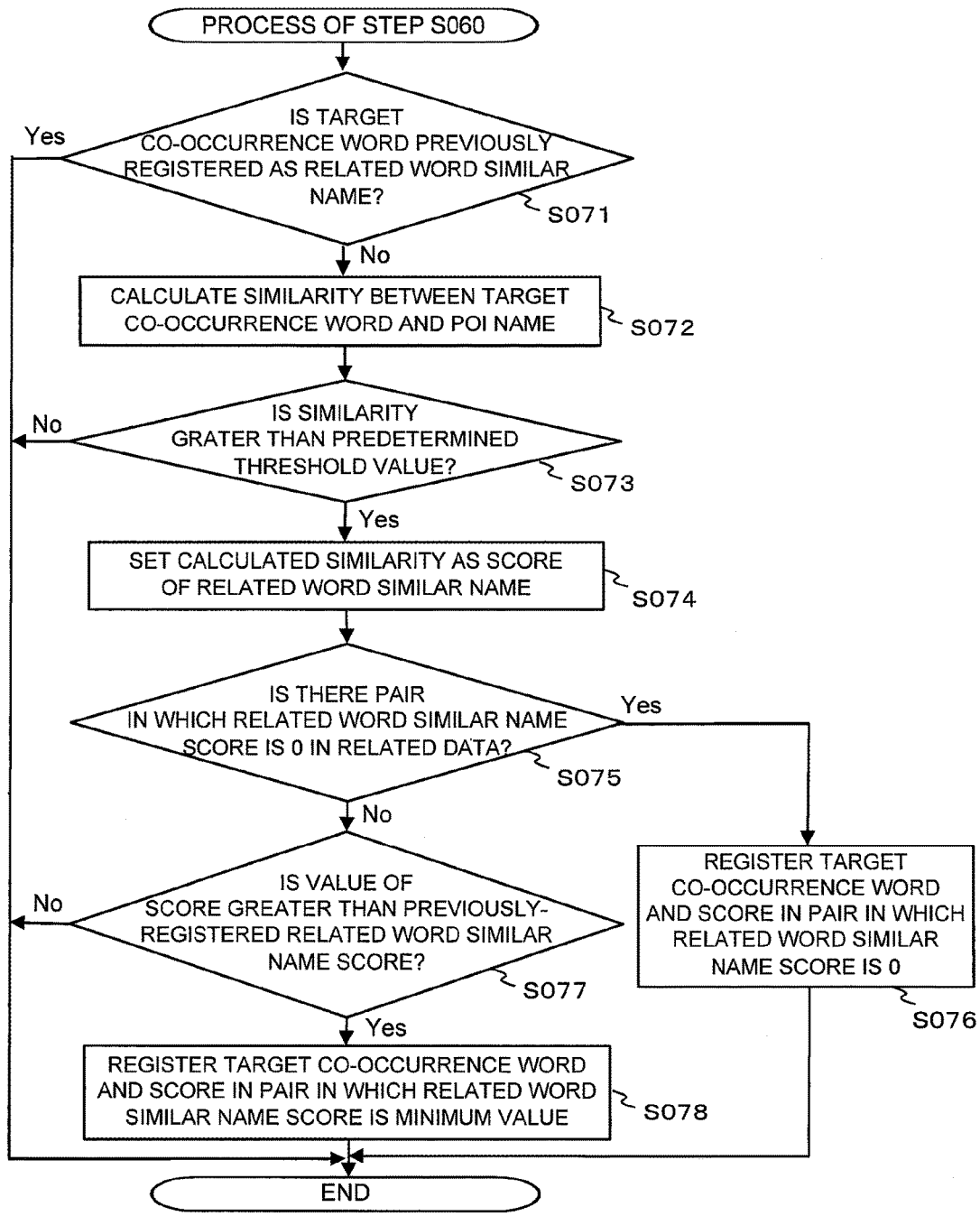
FIG. 14 is a flowchart illustrating a flow of a process of step S060 according to another embodiment (second embodiment) of the present invention.

Next, there will be described the determination process (hereinafter, referred to as a process of step S060) for determining whether to store a target co-occurrence word in the related data 500 as a related word similar name. FIG. 14 is a flowchart illustrating a flow of the process of step S060.

When a relevant process is started, the related data generating unit 13 determines whether a target co-occurrence word is previously stored as a related word similar name (step S071). Specifically, the related data generating unit 13 determines whether a related word similar name identical to the target co-occurrence word acquired in step S059 is stored in a related word similar name string field 504. In addition, when it is determined that the target co-occurrence word is stored in a related word similar name string field 504 (Yes in step S071), the related data generating unit 13 ends the flow. On the other hand, when it is determined that the target co-occurrence word is not stored in a related word similar name string field 504 (No in step S071), the related data generating unit 13 calculates a similarity between the target co-occurrence word and a POI name (step S072). Specifically, the related data generating unit 13 calculates the similarity of the target co-occurrence word to the POI name by using the following formula 5 in the case of Japanese words. The similarity has a value equal to or greater than 0 and equal to or less than 1.

$$\text{Similarity} = \frac{\begin{array}{c}\text{Number of characters identical}\\\text{between } POI \text{ name and target}\\\text{co-occurrence word (characters}\\\text{except for leading character may}\\\text{be skipped over)}\end{array}}{\begin{array}{c}\text{Number of characters in target}\\\text{co-occurrence word}\end{array}} \quad \text{[Mathematical Formula 5]}$$

For example, when the POI name is "AAABBB", and the target co-occurrence word is "AAAB", the related data generating unit 13 calculates the similarity as 4/4. Also, when the POI name is "AAABBB", and the target co-occurrence word is "BAAB", the leading character "B" of the target co-occurrence word is not identical to the leading character "A" of the POT name. Therefore, the related data generating unit 13 calculates the similarity as 0/4. Also, when the POI name is "AAABBB", and the target co-occurrence word is "ABC", the related data generating unit 13 calculates the similarity as 2/3, since characters except for the leading character of the target co-occurrence word may be skipped over.

When the POI name and the target co-occurrence word are English words, the similarity is calculated by the following formula 6.

$$\text{Similarity} = \frac{\begin{array}{c}\text{Number of characters}\\\text{(from leading character) identical}\\\text{between } POI \text{ name}\\\text{(consonant extraction) and target}\\\text{co-occurrence word}\\\text{(consonant extraction)}\end{array}}{\begin{array}{c}\text{Number of characters}\\\text{in target co-occurrence word}\\\text{(consonant extraction)}\end{array}} \quad \text{[Mathematical Formula 6]}$$

Next, the related data generating unit 13 determines whether the similarity is greater than a predetermined threshold value (step S073). Specifically, the related data generating unit 13 determines whether the similarity of the target co-occurrence word calculated in step S072 is greater than a predetermined threshold value. In addition, when it is determined that the similarity is not greater than the threshold value (No in step S073), the related data generating unit 13 ends the flow. On the other hand, when it is determined that the similarity is greater than the threshold value (Yes in step S073), the related data generating unit 13 sets the calculated similarity as a score of the related word similar name.

Next, the related data generating unit 13 determines whether there is a pair in which a related word similar name score is 0 in the related data 500 (step S075). Specifically, the related data generating unit 13 determines whether there is a related word similar name score field 505 in which 0 is stored in the related data 500. When there is the related word similar name score field 505 (Yes in step S075), the related data generating unit 13 stores the target co-occurrence word and the score in a pair of 0 (step S076). Specifically, the related data generating unit 13 specifies a related word similar name score field 505 in which zero is stored, and a related word similar name string field 504 which constitutes one pair along with the score field 505. Also, the related data generating unit 13 stores a target co-occurrence word in the specified related word similar name string field 504 and stores a score calculated in step S074 in the specified usual related word score field 505. Also, the related data generating unit 13 ends the flow after step S076.

On the other hand, when there is no pair in which a related word similar name score is 0 in the related data 500 (No in step S075), the related data generating unit 13 determines whether the score calculated in step S074 is greater than the related word similar name score which is previously stored (step S077). That is, the related data generating unit 13 performs the determination by comparing the score calculated in step 3074 with the related word similar name score previously stored in the related data 500. When it is determined that the score calculated in step S074 is not greater than the related word similar name score (No in step S077), the related data generating unit 13 ends the flow.

On the other hand, when it is determined that the score calculated in step S074 is greater than the related word similar name score (Yes in step S077), the related data generating unit 13 stores the target co-occurrence word and the score in a pair in which a related word similar name score is the minimum value (step S078). Specifically, the related data generating unit 13 compares the previously-stored related word similar name scores with one another and specifies the related word similar name score field 505 in which the score of the minimum value is stored and the related word similar name string field 504 which constitutes one pair along with the score field 505. Also, the related data generating unit 13 stores a target co-occurrence word in the specified related word similar name string field 504 and stores a score calculated in step S074 in the specified related word similar name score field 505.

Also, when the related word similar name and the score are stored in the related data 500, the related data generating unit 13 ends the flow.

Figure 15:
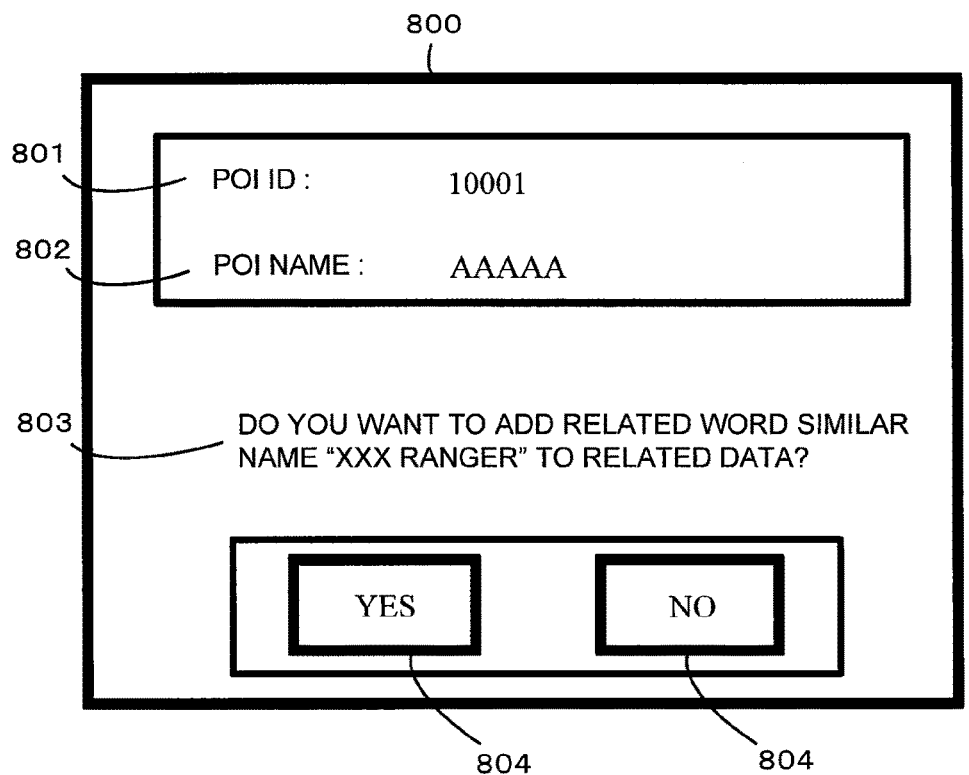
FIG. 15 is a diagram illustrating an example of a display screen of a related data generating apparatus according to another embodiment (second embodiment) of the present invention.

In the processes of step S076 and the step S078, the display information generating unit 15 may generate message screen information which confirms whether to register the related word similar name string in the related data 500. FIG. 15 is a diagram illustrating an example of a display screen 800 of a related data generating apparatus 100. The display information generating unit 15 generates and outputs, to the display device 5, indication information displaying, for example, a POI ID 801, a POI name 802, a message 803, such as "Do you want to add related word similar name 'XXX RANGER' to related data?", and an indication receiving button 804 of "YES" or "NO". An administrator of the related data generating apparatus 100 checks the message, and then selects the indication receiving button 804 of "YES". Therefore, the related data generating unit 13 stores the related word similar name in the related word similar name string field 504 of the related data 500.

According to the related data generating apparatus 100, it is possible to generate the related data 500 including a related word having a high relevance to a predetermined keyword and a higher freshness. In particular, the related data generating apparatus 100 registers a vocabulary having a high similarity to the predetermined keyword as a related word similar name in the related data 500. Therefore, not only usual related word used in the posted data 200 along with the keyword, but also a vocabulary similar to the keyword, that is, an abbreviation or the like can be registered in the related data 500.

<Third Embodiment>

Hereinafter, a related data generating apparatus 100 according to a third embodiment of the present invention will be described. The related data generating apparatus 100 according to the third embodiment calculates a trend level of a target (for example, POI or the like) specified by a predetermined keyword. Specifically, the related data generating apparatus 100 according to the present embodiment includes a trend level data generating unit 14 as a functional unit, and the trend level data generating unit 14 calculates a trend level of a target specified by the keyword by using the predetermined keyword and the related data 500 generated in the above-described embodiment. Since a basic hardware configuration and functional blocks of the related data generating apparatus 100 are similar to those of the first embodiment and the second embodiment as described above, a detailed description thereof will be omitted.

The trend level data generating unit 14 is a functional unit that generates trend level data 900 including a trend level of a target specified by the predetermined keyword. Specifically, the trend level data generating unit 14 calculates the trend level of the target specified by the keyword by using the predetermined keyword, a usual related word string and a usual related word score mapped to the keyword, and a related word similar name string and a related word similar name score. Also, the trend level data generating unit 14 generates the trend level data 900 in which the calculated trend level is mapped to the keyword.

FIG. 16 is a diagram illustrating an example of the trend level data 900. The trend level data 900 is generated and updated by the trend level data generating unit 14. The trend level data 900 is information including a trend level of a target specified by a predetermined keyword. Specifically, the trend level data 900 has a field 901 for a target of a trend level and a field 902 for a trend level.

Information stored in the field 901 for a target of a trend level is information specifying a target (for example, a predetermined POI) specified by a predetermined keyword. Information stored in the field 902 for a trend level is information specifying a trend level indicating a degree of trend. In addition, the trend level data 900 is generated by the trend level data generating unit 14 by executing a trend level data generating process.

Figure 17:
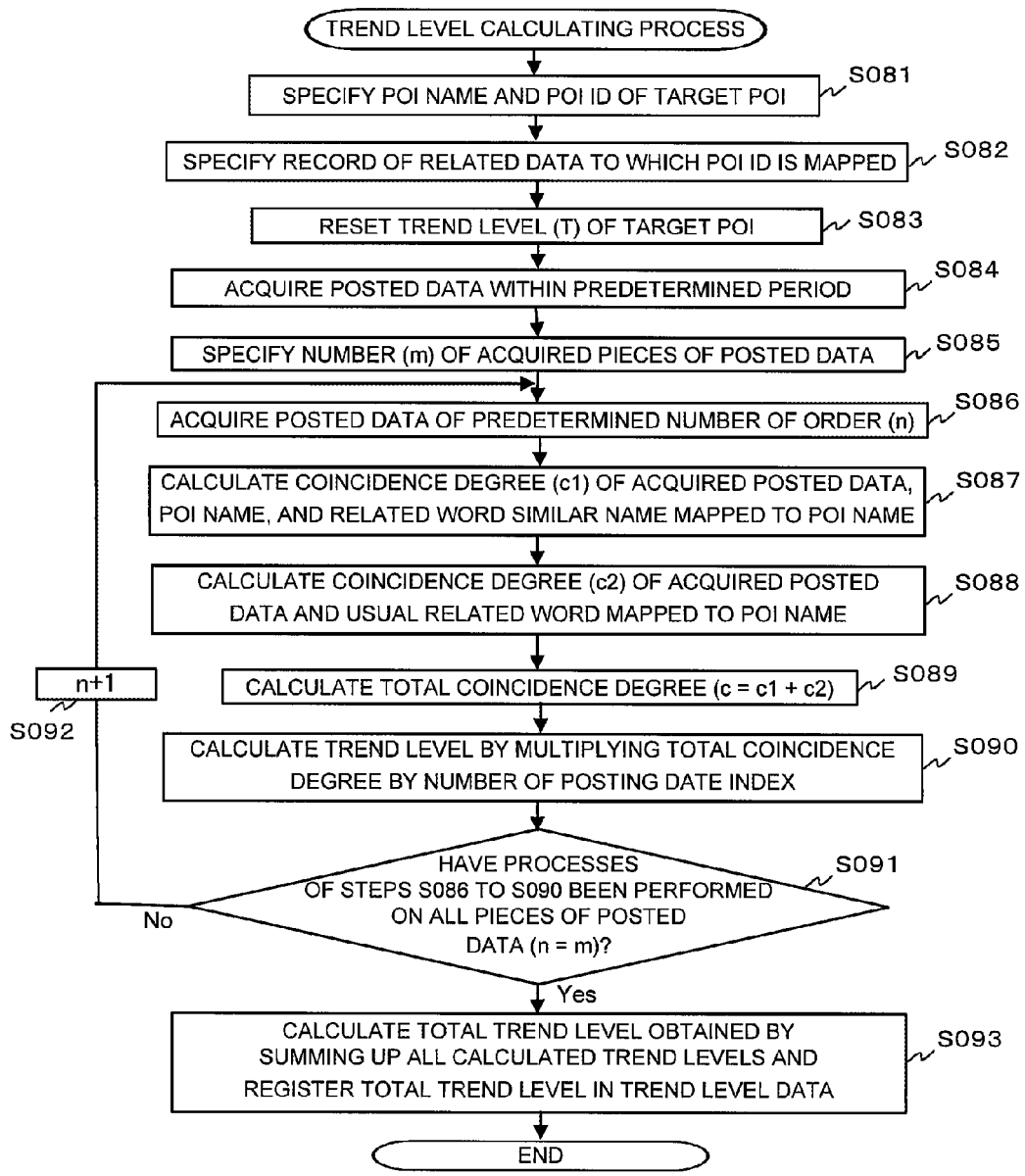
FIG. 17 is a flowchart illustrating a flow of a trend level calculating process according to another embodiment (third embodiment) of the present invention.

FIG. 17 is a flowchart illustrating a flow of a trend level calculating process. The trend level calculating process is periodically (for example, once a week) performed on all targets specified by a predetermined keyword (in the present embodiment, all POIs specified by a POI name) through batch processing executed in the related data generating apparatus 100.

When the trend level calculating process is started, the trend level data generating unit 14 specifies a POI name and a POI ID of a POI of a target (hereinafter, referred to as a target POI), of which the trend level is calculated, from the POI data 300 (step S081). Specifically, the trend level data generating unit 14 specifies a POI name and a POI ID of one POI specified by the batch processing from the POI data 300.

Next, the trend level data generating unit 14 specifies a record of the related data 500 to which the POI ID is mapped (step S082). Also, the trend level data generating unit 14 resets a trend level of the target POI (step S083). Specifically, the trend level data generating unit 14 specifies a record in which the target POI of the trend level data 900 is stored and sets a value of the field 902 for the trend level of the specified record to zero.

Next, the trend level data generating unit 14 acquires posted data 200 within a predetermined period (step S084).

For example, the trend level data generating unit 14 acquires posted data 200 posted during a predetermined period (for example, one month) at a predetermined time (for example, July) from the storage unit 20. The predetermined time and the predetermined period may be previously stored in the storage device 2 or the ROM 8.

Next, the trend level data generating unit 14 specifies the number (m) of pieces of acquired posted data 200 (step S085). Also, the trend level data generating unit 14 acquires posted data 200 of a predetermined number of order (n) (step S086). Specifically, numbers are assigned to the pieces of acquired posted data 200 and one piece of posted data 200 to which a minimum number is assigned is set as a first posted data, thereby acquiring the posted data 200 of a predetermined number of order.

Next, the trend level data generating unit 14 calculates a coincidence degree (c1) between the acquired posted data 200, and a POI name and a related word similar name mapped to the POI name (step S087). A coincidence degree calculating process of step S087 will be described in detail below.

Next, the trend level data generating unit 14 calculates a coincidence degree (c2) between the acquired posted data 200 and a usual related word mapped to the POI name (step S088). A coincidence degree calculating process of step S088 will be described in detail below.

Next, the trend level data generating unit 14 calculates a total coincidence degree (c=c1+c2) (step S089). Specifically, the trend level data generating unit 14 calculates a total coincidence degree by summing up the coincidence degree (c1) calculated in the coincidence degree calculating process of step S087 and the coincidence degree (c2) calculated in the coincidence degree calculating process of step S088.

Next, the trend level data generating unit 14 calculates a trend level by multiplying a total trend by a posting date index (step S090). Specifically, the trend level data generating unit 14 calculates a trend level by multiplying a coincidence degree by a predetermined index based on a posting date of the posted data 200. Also, the posting date index is a value which decreases as past posted data 200 is farther from the present time, and the index is previously stored in the storage device 2 or the ROM 8.

Subsequently, the trend level data generating unit 14 determines whether processes of steps 3086 to S090 have been performed on all pieces of posted data 200 (step S091). That is, the trend level data generating unit 14 determines whether a relationship of n=m is established. In addition, when it is determined that the processes have not been performed on all pieces of posted data 200 (No in step S091), the trend level data generating unit 14 increments the order of posted data 200 to be acquired by adding one to n (step S092), and acquires posted data 200 of a subsequent order.

On the other hand, when it is determined that the processes have been performed on all pieces of posted data 200 (Yes in step S091), the trend level data generating unit 14 calculates a total trend level obtained by summing up all trend levels calculated for respective pieces of posted data and registers the total trend level in the trend level data 900 (step S093). When the process of the step S093 is completed, the trend level data generating unit 14 ends the flow.

Figure 18:
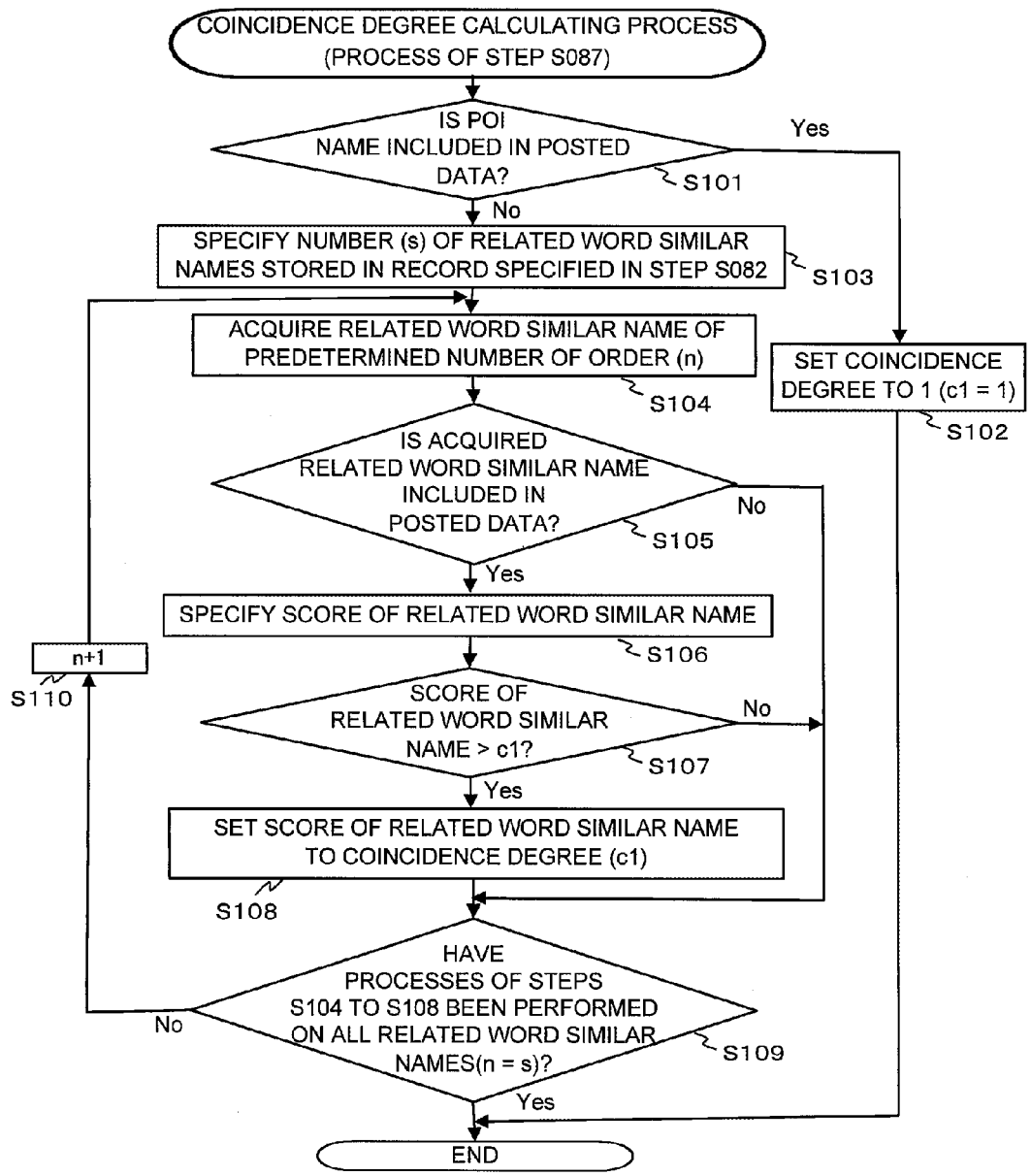
FIG. 18 is a flowchart illustrating a flow of a coincidence degree calculating process (process of step S087) according to another embodiment (third embodiment) of the present invention.

Next, the coincidence degree calculating process (process of step S087) will be described. FIG. 18 is a flowchart illustrating a flow of the coincidence degree calculating process (process of step S087). Before the process is started, the trend level data generating unit 14 secures a coincidence degree storing area for storing a coincidence degree (c1), for example, in the RAM 7 and sets a value of the coincidence degree storing area to zero.

Next, the trend level data generating unit 14 determines whether a POI name is included in posted data 200 (step S101). Specifically, the trend level data generating unit 14 determines whether the POI name acquired in step S081 is included in a posted body text of the posted data 200 acquired in step S086. When it is determined that the POI name is included in the posted data 200 (Yes in step S101), the trend level data generating unit 14 sets a coincidence degree to 1 (step S102), and ends the flow.

On the other hand, when it is determined that the POI name is not included in the posted data 200 (No in step S101), the trend level data generating unit 14 specifies the number (s) of related word similar names stored in the record specified in step S082 (step S103).

Next, the trend level data generating unit 14 acquires a related word similar name of a predetermined number of order (n) (step S104). Specifically, the trend level data generating unit 14 acquires a related word similar name of a predetermined number of order from among related word similar names stored in the related data 500, when a related word similar name which is stored at the leftmost column is assumed as a related word similar name of a first order.

Next, the trend level data generating unit 14 determines whether the acquired related word similar name is included in the posted data 200 (step S105). Specifically, the trend level data generating unit 14 determines whether the acquired related word similar name string is included in the posted body text of the posted data 200 acquired in step S086. When it is determined that the related word similar name is not included in the posted data 200 (No in step S105), the trend level data generating unit 14 proceeds to a process of step S109.

On the other hand, when it is determined that the related word similar name string is included in the posted data 200 (Yes in step S105), the trend level data generating unit 14 specifies a score of the related word similar name (step S106). Specifically, the trend level data generating unit 14 specifies a value stored in the related word similar name score field 505 which constitutes one pair along with the related word similar name string field 504.

Also, the trend level data generating unit 14 determines whether the specified score of the related word similar name is greater than the coincidence degree (c1) (step S107). For example, in a case where the determination process of step S107 is performed initially after the coincidence degree (c1) is set to zero, a score of the related word similar name becomes greater than the coincidence degree (c1=0) in which 0 is stored. Therefore, the trend level data generating unit 14 determines that a score of the related word similar name is greater than 0. On the other hand, when the score of the related word similar name is previously set to the coincidence degree (c1) by a process of step S108 as described below, the trend level data generating unit 14 compares the previously-set coincidence degree (c1) with the score of the related word similar name which is specified in step S106 in this time.

Subsequently, the trend level data generating unit 14 determines whether processes of steps S104 to S108 have been performed on all related word similar names (step S109). That is, the trend level data generating unit 14 determines whether a relationship of n=s is established. In addition, when it is determined that the processes have not been performed or all related word similar names (No in step S109), the trend level data generating unit 14 increments an order of a related word similar name to be acquired by adding one to n (step S110), and acquires a related word similar name of a subsequent order from the related data 500.

On the other hand, when it is determined that the processes have been performed on all related word similar names (Yes in step S109), the trend level data generating unit 14 ends the flow.

Figure 19:
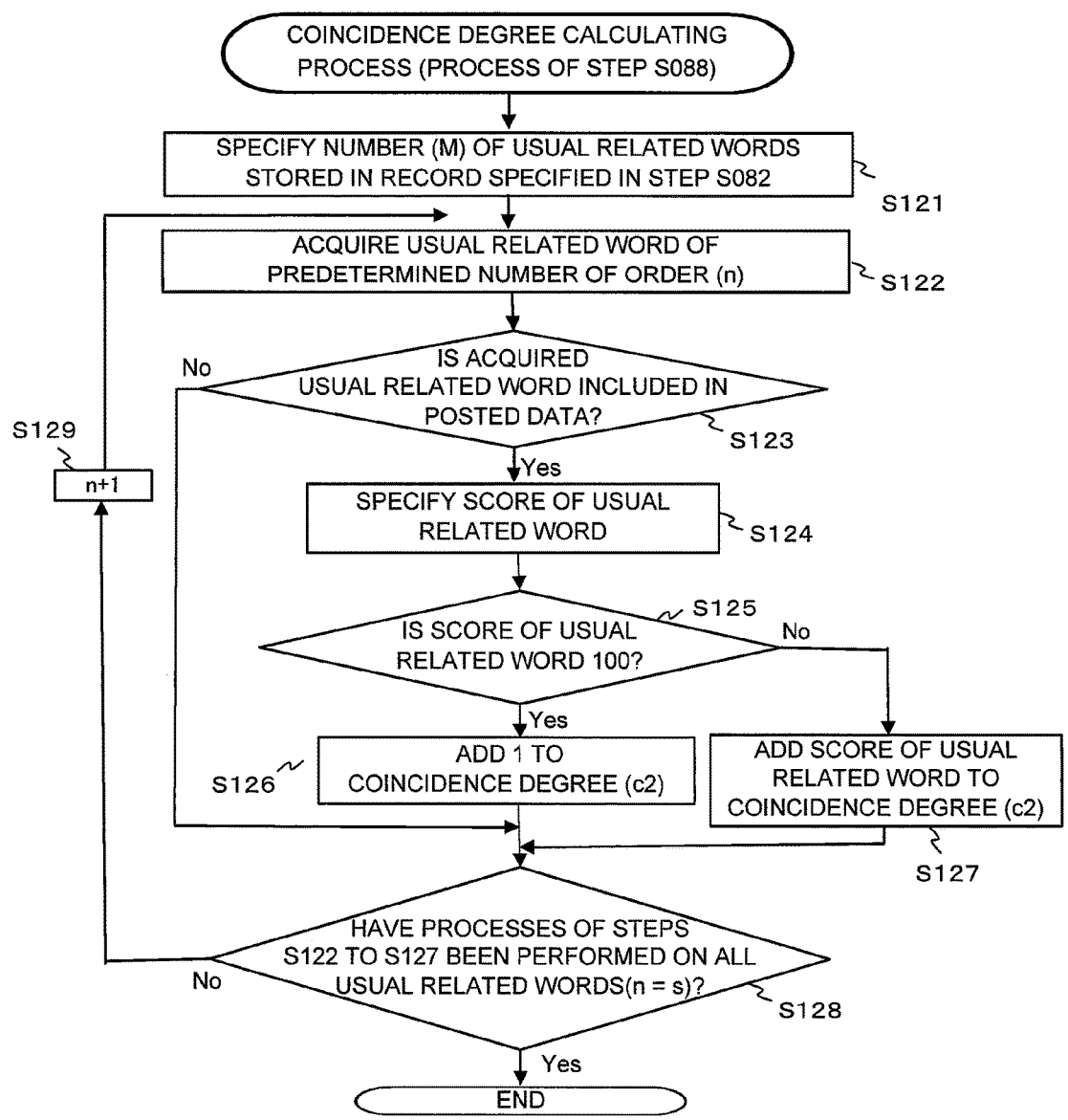
FIG. 19 is a flowchart illustrating a flow of a coincidence degree calculating process (process of step S088) according to another embodiment (third embodiment) of the present invention.

Next, the coincidence degree calculating process (process of step S088) will be described. FIG. 19 is a flowchart illustrating a flow of the coincidence degree calculating process (process of step S088). Before the process is started, the trend level data generating unit 14 secures a coincidence degree storing area for storing a coincidence degree (c2), for example, in the RAM 7 and sets a value of the coincidence degree storing area to zero.

Next, the trend level data generating unit 14 specifies the number (M) of usual related words stored in the record specified in step 3082 (step S121).

Next, the trend level data generating unit 14 acquires a usual related word of a predetermined number of order (n) (step S122). Specifically, the trend level data generating unit 14 acquires a usual related word of a predetermined number of order from among usual related word strings stored in the related data 500, when a usual related word string which is stored at the leftmost column is assumed as a usual related word string of a first order.

Next, the trend level data generating unit 14 determines whether the acquired usual related word is included in the posted data 200 (step S123). Specifically, the trend level data generating unit 14 determines whether the acquired usual related word string is included in the posted body text of the posted data 200 acquired in step S086. When it is determined that the usual related word is not included in the posted body text (No in step S123), the trend level data generating unit 14 proceeds to a process of step S128.

On the other hand, when it is determined that the usual related word string is included in the posted data 200 (Yes in step S123), the trend level data generating unit 14 specifies a score of the usual related word (step S124). Specifically, the trend level data generating unit 14 specifies a value stored in the usual related word score field which constitutes one pair along with the usual related word string field.

Next, the trend level data generating unit 14 determines whether the specified score of the usual related word is 100 (step S125). When it is determined that the score is not 100 (No in step S125), the trend level data generating unit 14 adds the score of the usual related word to the coincidence degree (c2) (step S127) and proceeds to a process of step S128.

On the other hand, when it is determined that the score is 100 (Yes in step S125), the trend level data generating unit 14 adds 1 to the coincidence degree (c2) (step S126) and proceeds to a process of step S128.

Subsequently, the trend level data generating unit 14 determines whether processes of steps S122 to S127 have been performed on all usual related words (step S128). That is, the trend level data generating unit 14 determines whether a relationship of n=s is established. In addition, when it is determined that the processes have not been performed on all usual related words (No in step S128), the trend level data generating unit 14 increments an order of a usual related word to be acquired by adding one to n (step S129), and acquires a usual related word of a subsequent order from the related data 500.

On the other hand, when it is determined that the processes have been performed on all usual related words (Yes in step S128), the trend level data generating unit 14 ends the flow.

Figure 20:
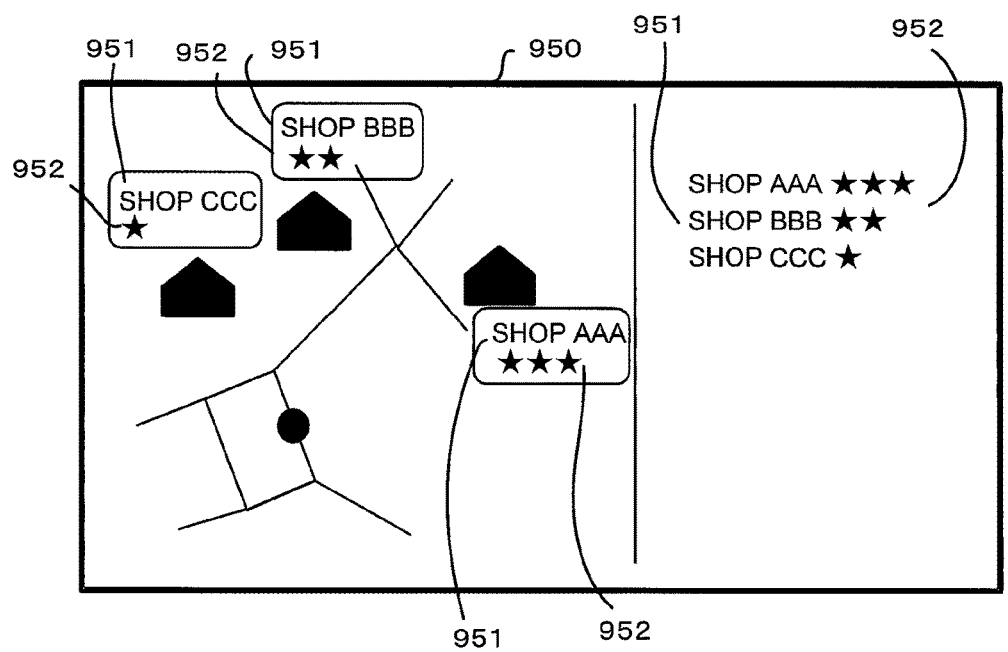
FIG. 20 is a diagram illustrating an example of a display screen on which an icon indicating a trend level is displayed according to another embodiment (third embodiment) of the present invention.

FIG. 20 is a diagram illustrating an example of a display screen 950 on which an icon indicating a trend level is displayed. When receiving a signal requesting acquirement of a trend level from an external apparatus through the communication unit 40, the display information generating unit 15 of the related data generating apparatus 100 generates display information. For example, when a signal requesting acquirement of information indicating a trend level of a POI is received from a navigation apparatus that is an external apparatus, the display information generating unit 15 specifies a trend level of a corresponding POI from trend level data 900, executes ranking according to the trend level, and generates display information (information indicating a rank by using the number of stars) indicating a rank. Also, the display information generating unit 15 maps the generated display information to a POI ID and transmits the display information to the navigation apparatus.

The external apparatus, such as the navigation apparatus that acquires the display information, displays a display screen 950 illustrated in FIG. 20. On the display screen 950, respective POIs 951, and star-shaped icons 952 indicating ranks according to trend levels are displayed.

According to the related data generating apparatus 100, it is possible to generate the related data 500 including a related word having a high relevance to a predetermined keyword and a higher freshness. In particular, the related data generating apparatus 100 can calculate a trend level of a target indicated by a keyword by using a predetermined keyword, a usual related word which is a co-occurrence word used in posted data 200 along with the keyword, and a related word similar name that is a similar name of the keyword. Also, the related data generating apparatus 100 generates display information, such as an icon indicating a trend level, and transmits the display information to the outside. As a result, an external apparatus can display the trend level of the target indicated by a predetermined keyword as in a state of being mapped to the target.

Although display information of an icon or the like indicating a trend level is generated in the above third embodiment, embodiments of the present invention are not limited thereto. The related data generating apparatus 100 may provide the trend level (numeral value) itself to the external apparatus.

Also, although generation of the related data 500 and generation of trend level data 900 of the POI are described in the first embodiment to the third embodiment, the present invention is not limited to the embodiments. For example, it is possible to apply the related data generating apparatus 100 to a process for acquiring a trend level of a product advertised on television commercials. In this case, product data in which a product name is registered is used, instead of the POI data 300. Also, it is possible to apply the related data generating apparatus 100 to a process for calculating a trend level of a buzzword or the like. In this case, buzzword data in which a buzzword is registered is used, instead of the POI data 300 or the product data. Also, the related data generating apparatus 100 can calculate trend levels for various targets in addition thereto.

Also, the related data generating apparatus 100 may generate display information indicating a usual related word to be mapped to a target of a keyword (in the above embodiment, POI). Specifically, the display information generating unit 15 generates display information for displaying a usual related word (for example, "HIGH PRICE HAMBURGER" or "HAMBURGER SET") stored in the related data 500 in association with the POI and transmits the display information to the external apparatus (for example, the navigation apparatus). As a result, the usual related word mapped to the POI is displayed on the external apparatus. Since the usual related word is a vocabulary (phrase) representing subject information included in an article posted on SNS or the like, very useful information is provided to a user.

The functional blocks of the related data generating apparatus 100 are classified according to primary processing contents in order to make it easy to understand functions of the related data generating apparatus 100 realized in the present embodiment, and the present invention is not limited by a classification method or names of the respective functions. In addition, each configuration of the related data generating apparatus 100 may be classified into sub-elements according to processing contents. Also, classification may be performed such that a single element executes more processes.

The present invention is not limited to the above embodiment but includes various variations. For example, the above embodiment has been described in detail in order to facilitate understanding of the present invention and the present invention is not necessarily limited to the embodiment having all of the components described above. Moreover, a part of the components of one embodiment can be replaced with components of any other embodiment and components of one embodiment can be added to the components of any other embodiment. Further, a part of components of each embodiment can be added to, deleted from, or replaced with other components.

Also, only those control lines and information lines that are deemed necessary for explanation purposes have been indicated. Not all control lines and information lines have been shown. Almost all structures may also be considered to be interconnected.

What is claimed is:

1. A related data generating apparatus, comprising:
   a memory;
   a network interface that is communicatively coupled to a user terminal and social network service; and
   a processor communicatively coupled to the memory and the network interface;
   wherein the processor is configured to execute instructions stored in the memory, that when executed by the processor cause the processor to:
   receive, using the network interface, a request from the user terminal that includes a predetermined keyword,
   retrieve, using the network interface, a vocabulary of word data that is used along with the predetermined keyword from the social network, wherein the vocabulary of word data is included in posted data from a plurality of different time periods,
   generate co-occurrence word data and an appearance frequency of the co-occurrence word from the vocabulary of word data retrieved from the social network,
   wherein the processor generates the co-occurrence word data including the co-occurrence word which is a second vocabulary used along with at least two different usual related words and an appearance frequency of the co-occurrence word in the posted data posted during a predetermined period, and stores, in the memory, the co-occurrence word in the related data as a related word similar name when a similarity between the co-occurrence word and the predetermined keyword is larger than a fifth threshold value,
   calculates a score having a larger value as a similarity between the co-occurrence word and the predetermined keyword increases and stores in the memory, the score as a score of the usual related word similar name corresponding to the co-occurrence word,
   determines whether a frequency of the co-occurrence word is high by:
   determining distribution of frequencies of the keyword over the plurality of different periods,
   calculating an average of the distribution of frequencies of the keyword over the plurality of different periods, and
   determining that the frequency of the co-occurrence word is high when the average of the distribution of frequencies exceeds a frequency threshold;
   on a condition that the frequency of the co-occurrence word is high, generates related data, the related data including the co-occurrence word as a usual related word, and
   transmits, using the network interface, the related data to the user terminal.

2. The related data generating apparatus according to claim 1, wherein the processor further:
   determines whether a temporal variation in the co-occurrence word is small by:
   calculating a ratio of the distribution of frequencies of the keyword over the plurality of different periods and the average of the distribution of frequencies of the keyword over the plurality of different periods, and
   determines that the temporal variation in the co-occurrence word is small when the ratio is less than a temporal threshold; and
   wherein the processor generates that related data on the condition that the frequency of the co-occurrence word is high and the temporal variation in the co-occurrence word is small.

3. The related data generating apparatus according to claim 1, wherein the processor further:
   calculates a score having a larger value as the appearance frequency of the co-occurrence word increases, and
   stores, in the memory, the score as a score of the usual related word corresponding to the co-occurrence word.

4. The related data generating apparatus according to claim 3, wherein the memory stores the co-occurrence word of which a score is greater than the score of the usual related word stored in the related data in the related data instead of the usual related word.

5. The related data generating apparatus according to claim 3, wherein the processor further: calculates a score of the usual related word based on an appearance frequency of the usual related word in a particular period when the usual related word identical to the co-occurrence word is registered in the related data.

6. The related data generating apparatus according to claim 1, further comprising a display that is communicatively coupled to the processor;
   wherein the processor further: causes the display to display the usual related word along with a target indicated by the predetermined keyword.

7. The related data generating apparatus according to claim 1, wherein the processor further:
   calculates a degree at which the predetermined keyword or the related word similar name to which the predetermined keyword is mapped is identical to a vocabulary included in the posted data posted during the predetermined period as a first coincidence degree, calculates a degree at which the related word similar name to which the predetermined keyword is mapped is identical to a vocabulary included in the posted data posted during the predetermined period as a second coincidence degree, calculates a value obtained by summing up the first coincidence degree and the second coincidence degree calculated for all pieces of posted data within the predetermined period, as a trend level of a target indicated by the keyword, and generates a trend level data in which the trend level is stored to be mapped to the predetermined keyword.

8. The related data generating apparatus according to claim 7, wherein the processor further:

sets a predetermined value as the first coincidence degree when the predetermined keyword is identical to a vocabulary included in the posted data, determines whether the related word similar name mapped to the keyword is identical to the vocabulary included in the posted data when the predetermined keyword is not identical to the vocabulary included in the posted data, and sets the first coincidence degree, which is a value smaller than the predetermined value, by using a score of the related word similar name identical to the vocabulary when the related word similar name is identical to the vocabulary included in the posted data.

9. The related data generating apparatus according to claim 7, further comprising a display that is communicatively coupled to the processor, wherein the processor causes the display to display information indicating the trend level.

10. A related data generating and retrieving method comprising:

receiving from a user terminal a request that includes a predetermined keyword;

retrieving a vocabulary of word data that is used along with the predetermined keyword from a social network service, wherein the vocabulary of word data is included in posted data from a plurality of different time periods;

generating co-occurrence word data and an appearance frequency of the co-occurrence word, from the vocabulary of word data retrieved from the social network service;

wherein the generating the co-occurrence word data includes the co-occurrence word which is a second vocabulary used along with at least two different usual related words and an appearance frequency of the co-occurrence word in the posted data posted during a predetermined period, and stores, in the memory, the co-occurrence word in the related data as a related word similar name when a similarity between the co-occurrence word and the predetermined keyword is larger than a fifth threshold value, calculating a score having a larger value as a similarity between the co-occurrence word and the predetermined keyword increases and stores in the memory, the score as a score of the usual related word similar name corresponding to the co-occurrence word, determining whether a frequency of the co-occurrence word is high by:

determining a ratio of distribution of frequencies of the keyword over the plurality of different periods, calculating an average of the distribution of frequencies of the keyword over the plurality of different periods, and determining that the frequency of the co-occurrence word is high when the average of the distribution of frequencies exceeds a frequency threshold;

on a condition that the frequency of the co-occurrence word is high, generating related data, the related data including the co-occurrence word as a usual related word, and transmitting the related data to the user terminal.

11. A non-transitory computer readable storage medium that stores instructions that cause a processor of a computer to:

receives, using a network interface of the computer, a request from a user terminal that includes a predetermined keyword, retrieves, using the network interface, a vocabulary of word data that is used along with the predetermined keyword from a social network service, wherein the vocabulary of word data is included in posted data from a plurality of different time periods, generates co-occurrence word data and an appearance frequency of the co-occurrence word from the vocabulary of word data retrieved from the social network service, wherein the processor generates the co-occurrence word data including the co-occurrence word which is a second vocabulary used along with at least two different usual related words and an appearance frequency of the co-occurrence word in the posted data posted during a predetermined period, and stores, in the memory, the co-occurrence word in the related data as a related word similar name when a similarity between the co-occurrence word and the predetermined keyword is larger than a fifth threshold value, calculates a score having a larger value as a similarity between the co-occurrence word and the predetermined keyword increases and stores in the memory, the score as a score of the usual related word similar name corresponding to the co-occurrence word, determines whether a frequency of the co-occurrence word is high by:

determining distribution of frequencies of the keyword over the plurality of different periods, calculating an average of the distribution of frequencies of the keyword over the plurality of different periods, and determining that the frequency of the co-occurrence word is high when the average of the distribution of frequencies exceeds a frequency threshold;

on a condition that the frequency of the co-occurrence word is high, generates related data, the related data including the co-occurrence word as a usual related word, and transmits, using the network interface, the related data to the user terminal.

* * * * *